United States Patent
Burkholz et al.

(10) Patent No.: US 12,502,507 B2
(45) Date of Patent: Dec. 23, 2025

(54) MULTI-LUMEN EXTENSION SYSTEM

(71) Applicant: Becton, Dickinson and Company, Franklin Lakes, NJ (US)

(72) Inventors: Jonathan Karl Burkholz, Salt Lake City, UT (US); Megan Scherich, Salt Lake City, UT (US); Yiping Ma, Layton, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 535 days.

(21) Appl. No.: 17/127,623

(22) Filed: Dec. 18, 2020

(65) Prior Publication Data

US 2021/0213245 A1 Jul. 15, 2021

Related U.S. Application Data

(60) Provisional application No. 62/959,101, filed on Jan. 9, 2020.

(51) Int. Cl.
*A61M 25/00* (2006.01)
*A61M 25/09* (2006.01)

(52) U.S. Cl.
CPC ........ *A61M 25/0026* (2013.01); *A61M 25/09* (2013.01); *A61M 2025/0039* (2013.01);
(Continued)

(58) Field of Classification Search
CPC ...... A61M 25/0026; A61M 2025/0039; A61M 25/09; A61M 2025/0062; A61M 2025/09116; A61M 2025/0037; A61M 25/09041; A61M 25/0606; A61M 25/0113; A61M 2005/1588; A61M 2025/0019; A61M 25/0111; A61M 5/1582; A61M 5/162; A61M 25/0017; A61M 25/0097; A61M 25/0905; A61M 5/158; A61M 5/14; A61M 2005/1587; A61M 25/0029; A61M 39/10; A61M 25/0631; A61M 25/0136; A61M 25/0693; A61B 5/153;
(Continued)

(56) References Cited

U.S. PATENT DOCUMENTS 5,555,893 A 9/1996 Hackett et al.
6,004,310 A 12/1999 Bardsley et al.
(Continued)

FOREIGN PATENT DOCUMENTS

JP H788193 A 4/1995
WO 2018/152059 8/2018
(Continued)

*Primary Examiner* — Michael J Tsai
*Assistant Examiner* — Kathleen Paige Farrell
(74) *Attorney, Agent, or Firm* — The Webb Law Firm

(57) ABSTRACT

A multi-lumen extension system may include a first lumen forming a fluidic channel within the multi-lumen extension system; a second lumen forming a non-fluidic channel within the multi-lumen extension system; a patency instrument housed within the second lumen; a seal between the first lumen and the second lumen to prevent fluid from entering the second lumen from the first lumen; and a grip formed along the second lumen and operatively coupled to the patency instrument housed within the second lumen to selectively advance the patency instrument along the second lumen.

12 Claims, 15 Drawing Sheets

(52) U.S. Cl.
CPC ............ *A61M 2025/0062* (2013.01); *A61M 2025/09116* (2013.01)

(58) Field of Classification Search
CPC .......... A61B 5/150992; A61B 5/15003; A61B 5/154; A61B 5/150206; A61B 2017/00469
See application file for complete search history.

(56) References Cited

U.S. PATENT DOCUMENTS

| | | |
|---|---|---|
| 9,445,868 B2 | 9/2016 | Hull et al. |
| 2001/0011161 A1* | 8/2001 | Edwards et al. ....... A61B 18/00 |
| 2004/0122363 A1 | 6/2004 | Gribbons et al. |
| 2005/0209582 A1 | 9/2005 | Quinn et al. |
| 2007/0010863 A1* | 1/2007 | Stenzel ................. A61M 29/02 623/1.1 |
| 2008/0200904 A1* | 8/2008 | Cluff .................... A61M 25/00 604/537 |
| 2009/0105724 A1* | 4/2009 | Yoshizaki et al. .......................... A61M 2025/09116 |
| 2010/0210934 A1* | 8/2010 | Belson ............. A61B 5/150503 600/371 |
| 2014/0276135 A1* | 9/2014 | Agah et al. ........... A61M 25/09 |
| 2016/0287065 A1* | 10/2016 | Ha ..................... A61B 1/00154 |
| 2018/0289926 A1* | 10/2018 | Haldis et al. ......... A61M 25/09 |
| 2019/0117395 A1* | 4/2019 | Levi .......................... A61F 2/95 |
| 2019/0321590 A1 | 10/2019 | Burkholz et al. |
| 2020/0001051 A1* | 1/2020 | Huang ................. A61M 25/06 |
| 2020/0100716 A1* | 4/2020 | Devgon ............. A61B 5/15003 |

FOREIGN PATENT DOCUMENTS

| | | | |
|---|---|---|---|
| WO | 2018152059 A1 | 8/2018 | |
| WO | 2019139848 A1 | 7/2019 | |
| WO | WO2019243515 | * 12/2019 | ........... A61B 1/0052 |
| WO | WO20192435815 | * 12/2019 | ........... A61B 1/0052 |

* cited by examiner

MULTI-LUMEN EXTENSION SYSTEM

RELATED APPLICATIONS

This application claims the benefit of U.S. Provisional Application No. 62/959,101, filed Jan. 9, 2020, and entitled MULTI-LUMEN EXTENSION SYSTEM, which is incorporated herein in its entirety.

BACKGROUND

Patency is the state or quality of a fluid channel within a patient's body being free of blockages. Specifically, an intravenous (IV) device may have a level of patency when a fluid such as blood or a medicament may pass through the IV device. During use of an IV device, the IV device is inserted into a patient's blood vessel and, in some embodiments, a needle is pulled out of a catheter while the catheter remains within the patient's blood vessel. In some circumstances, the IV device is left to remain in the patient's blood vessel for up to 30 or more days. This is done so as to allow a clinician or other health care provider (HCP) to have fluidic access to the patient's blood stream during care. This continuous fluid access to the patient's blood stream allows a clinician or other HCP to, when appropriate, draw one or a plurality of blood samples or administer one or more infusing fluids, such as normal saline solution, various medicaments, and total parenteral nutrition.

The patency of the IV device may be compromised, however, while the IV device is within the patient's blood vessel. Any blockage may persist and cause the IV device to fail necessitating another administration of an IV device into the patient's body. This may increase the trauma felt by the patient and lead to other medical issues such as inflammation of the blood vessel among other medical issues.

The subject matter claimed herein is not limited to embodiments that solve any disadvantages or that operate only in environments such as those described herein. Rather, this background is provided to describe an environment in which the presently described embodiments may operate.

SUMMARY

The present disclosure relates generally to a multi-lumen extension system used to interface with an IV device that provides for a fluidic path to the IV device while also providing for a patency instrument used to periodically check or improve the patency of the IV device while the IV device is within a patient's blood vessel. In some embodiments, the multi-lumen extension system may include: a first lumen forming a fluidic channel within the multi-lumen extension system; a second lumen forming a non-fluidic channel within the multi-lumen extension system; a patency instrument housed within the second lumen; a seal between the first lumen and the second lumen to prevent fluid from entering the second lumen from the first lumen; and a grip formed along the second lumen and operatively coupled to the patency instrument housed within the second lumen to selectively advance the patency instrument along the second lumen.

In some embodiments, the grip is not physically and directly coupled to the patency instrument thereby allowing the patency device to remain within a sealed environment during use and away from introduction to any contaminates. In some embodiments, during operation, a clinician or other HCP may draw blood from and provide infusing fluids, such as normal saline solution, various medicaments, and total parenteral nutrition into the patient's bloodstream without manipulating the IV device itself. This is because the multi-lumen extension system described herein, interfaces with a proximal end of the IV device while the distal end of the multi-lumen extension system is coupled thereto. This allows the IV device to be secured to the patient's body via, for example, medical tape or a securement dressing so that the IV device remains stationary while the multi-lumen extension system is used. Thus, the multi-lumen extension system to be placed off-site from the IV device while still allowing the clinician to draw blood from the IV device via the first lumen, inject infusing fluids, such as normal saline solution, various medicaments, and total parenteral nutrition into the patient's bloodstream via the first lumen, and the introduction of a patency instrument into the IV device via the second lumen.

In some embodiments, the first lumen and second lumen of the multi-lumen extension system are formed coaxially within the multi-lumen tube. This may provide for the arrangement of the first lumen and the second lumen side-by-side so as to organize the lumens for convenient access by a clinician.

In some embodiments, the grip of the multi-lumen extension system may include a ring formed coaxially around the second lumen and a plurality of ball bearings or other types of rollers for low friction sliders formed between the ring and an outside wall of the second lumen with the patency instrument including a surface that engages the plurality of ball bearings to cause the patency instrument to move within the second lumen upon movement of the ring. In some embodiments described herein, the second lumen includes a gas vent that allows gases to escape from the second lumen upon movement of the patency instrument.

In some embodiments, the multi-lumen extension system may also include a luer-lock access device (LLAD) operatively coupled to a proximal end of the first lumen. This may allow for the selective engagement of a luer-lock to the proximal end of the multi-lumen extension system for blood draws. Still further, in some embodiments, the proximal end of the first lumen, at least, may include a coupling device so that any type of blood infusion or blood sampling device may be coupled thereto for the administration of infusing fluids, such as normal saline solution, various medicaments, and total parenteral nutrition or blood draws, respectively.

In some embodiments, the grip of the multi-lumen extension system may include a magnetic hub formed at a proximal end of the patency instrument. With this magnetic hub, the grip of the multi-lumen extension system may also include a permanent magnetic ring formed coaxially around the second lumen and magnetically coupled to the magnetic hub to cause the patency instrument to move within the second lumen upon movement of the permanent magnetic ring.

In some embodiments, the grip of the multi-lumen extension system is mechanically coupled to a proximal end of the patency instrument via a channel formed through a multi-lumen tube formed coaxially around the first lumen and the second lumen. In this embodiment, the mechanically coupled grip may include a channel through which the first lumen passes.

In an embodiment, the multi-lumen extension system may include the second lumen that is generally perpendicular or non-parallel to a distal end of the major axis of the first lumen. This may allow for the clinician to access the first lumen and second lumen at different locations apart from the IV device to which the multi-lumen extension system is coupled to.

As described herein, the multi-lumen extension system includes a second lumen that includes a patency instrument therein. In these embodiments, the patency instrument may be formed coaxially within the second lumen. In an embodiment, the patency instrument is a guidewire or other patency enhancing structure formed coaxially within the second lumen and moved within the second lumen using the grip as described herein.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying drawings in which.

DESCRIPTION OF EMBODIMENTS

Figure 1:
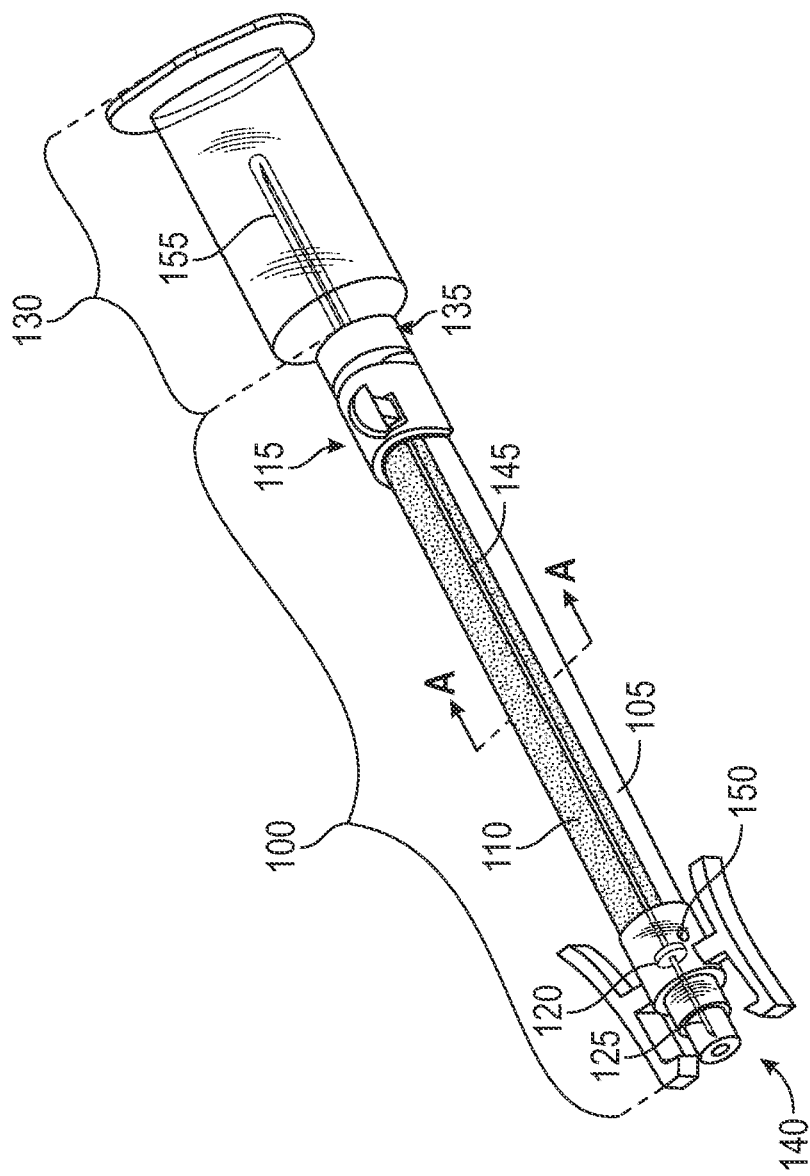
FIG. 1 is a perspective view of a multi-lumen extension system according to an embodiment of the present disclosure.

As used herein, the term "proximal" refers to a location on the needle of an intravenous therapy system that, during use, is closest to the clinician using the intravenous therapy system and farthest from the patient in connection with whom the device is used. Conversely, the term "distal" refers to a location on the needle of an intravenous therapy system that, during use, is farthest from the clinician using the intravenous therapy system and closest to the patient in connection with whom the intravenous therapy system is used.

As used herein, the term "top", "up" or "upwardly" refers to a location on the needle of this intravenous therapy system that, during use, is radially away from the longitudinal axis of the intravenous therapy system and away from the patient's skin. Conversely, as used herein, the term "bottom", "down" or "downwardly" refers to a location on the needle of this intravenous therapy system that, during use, is radially away from the longitudinal axis of the device and toward the patient's skin.

As used herein, the term "in" or "inwardly" refers to a location with respect to the needle of this intravenous therapy system that, during use, is toward the inside of the intravenous therapy system. Conversely, as used herein, the term "out" or "outwardly" refers to a location with respect to the needle of this intravenous therapy system that, during use, is toward the outside of the intravenous therapy system.

As used herein, the term "formed" refers to the construction, creation, production, arrangement, or placement of an element.

The figures may use like reference numbers for like elements in the different embodiments. Although the embodiments described herein are used in connection for use as an intravenous therapy system to receive a blood sample or introduce a medicament into the body of a patient, it is to be understood that this intravenous therapy system is applicable to other medical devices where it is desirable for a needle and/or catheter to be inserted into a blood vessel of a patient. In addition, while the embodiments of the intravenous therapy system are satisfied by embodiments in many different forms, there are shown in the drawings and herein described in detail, some embodiments within the scope of the disclosure.

FIG. 1 is a perspective view of a multi-lumen extension system 100 according to an embodiment of the present disclosure. As described herein, the multi-lumen extension system 100 may include a first lumen 105 and a second lumen 110. In an embodiment, the first lumen 105 may be a fluidic channel through which blood, a flushing agent, an infusing fluid such as normal saline solution, various medicaments, and/or total parenteral nutrition may be passed through. In an embodiment, the first lumen 105 may be fluidically coupled, at a proximal end 135 of the first lumen 105, to a fluidic source. In a specific example shown in FIG. 1, the proximal end 135 of the first lumen 105 may be coupled to a luer-lock access device (LLAD) 130. The LLAD 130 may include a needle 155 to interface with, for example, a blood sample tube such as a VACUTAINER® blood sample collection tube produced by Becton, Dickinson and Company of Franklin Lakes, NJ. Although the present description describes the first lumen 105 as being fluidically coupled to a LLAD 130, the present description contemplates that any fluidic sampling device or fluid reservoir may be coupled to the proximal end 135 of the first lumen 105 so as to sample blood or provide infusing fluids, such as normal saline solution, various medicaments, and total parenteral nutrition, respectively.

In an embodiment, the first lumen 105 may be fluidically coupled to an IV device at a distal end 140 of the multi-lumen extension system 100 via a distal end 150 of the first lumen 105. The distal end 140 of the multi-lumen extension system 100 may also include a connector used to couple the multi-lumen extension system 100 to the IV device. In the specific example shown in FIG. 1, the distal end 140 of the multi-lumen extension system 100 includes a male adapter used to interface with a female component on the IV device. The male adapter may allow for a distal end 150 of the first lumen 105 to exit into a hollow formed within the male adapter.

The distal end 140 of the multi-lumen extension system 100 may further include a number of coupling mechanisms that couple the distal end 140 of the multi-lumen extension system 100 to the IV device. Although FIG. 1 shows that the distal end 140 includes a male adapter and coupling mechanisms used to interface with a female adapter on an IV device, the present description contemplates that other types of adapters (including a female adapter) may be used to couple the distal end 140 of the multi-lumen extension system 100 an IV device.

The multi-lumen extension system 100 also includes a second lumen 110. In the embodiment shown in FIG. 1, the second lumen 110 lies, generally, parallel with the first lumen 105. In an alternative embodiment, as described herein, the first lumen 105 and second lumen 110 may be generally formed perpendicular to each other with the distal end 150 of the first lumen 105 and the distal end 140 of the multi-lumen extension system 100 bisecting along a length of the first lumen 105 and/or second lumen 110. In the embodiment where the second lumen 110 lies, generally, parallel with the first lumen 105, a multi-lumen tube 145 may be used to house the first lumen 105 and second lumen 110. This multi-lumen tube 145 may be coaxially formed around the first lumen 105 and second lumen 110 so that these lumens 105, 110 may be organized at a single location for access by a clinician or other HCP. The multi-lumen tube 145 may, in this embodiment, form part of a structure used to couple the first lumen 105 and second lumen 110 to the distal end 140 of the multi-lumen extension system 100 and a proximal end of the multi-lumen extension system 100 such as the proximal end 135 of the first lumen 105.

The multi-lumen extension system 100 may include, in some embodiments, a grip 115. The grip 115 may be any device that is operatively coupled to a patency device 125 formed within the second lumen 110. The grip 115 may be actuated by a clinician or other HCP to cause the patency device 125 to be selectively advanced within the second lumen 110 and cause a portion of the patency device 125 to extend out of a distal end 140 of the multi-lumen extension system 100. As described herein, the multi-lumen extension system 100 may be coupled to an IV device that is placed within a patient's blood vessel. The advancement of the patency device 125 by the actuation of the grip 115 causes the patency device 125 to extend out of the second lumen 110 and through any fluidic channels formed in the IV device so as to dislodge any obstructions or check the patency of the IV device. During operation of the multi-lumen extension system 100, the clinician may selectively drag the grip 115 towards the distal end 140 of the multi-lumen extension system 100 to extend the patency device 125 out of the multi-lumen extension system 100. The clinician may also drag the grip 115 towards the proximal end of the second lumen 110 and multi-lumen extension system 100 to retract the patency device 125 back into the second lumen 110 to allow for subsequent patency checks or fluid transfers through the multi-lumen extension system 100 via the first lumen 105. Additionally, by dragging the grip 115 towards the proximal end of the second lumen 110 and multi-lumen extension system 100 the patency device 125 is enclosed within the second lumen 110 so that the patency device 125 remains inside the second lumen 110 prior to disconnecting the multi-lumen extension system 100 from the IV device. This reduces the risk of blood exposure from the patency device 125 outside of the multi-lumen extension system 100.

In an embodiment, the multi-lumen extension system 100 may include a seal 120. The seal 120 may be used to fluidically seal the second lumen 110 from the fluids passing through the first lumen 105 and through a distal end 140 of the multi-lumen extension system 100. As described herein and illustrated in FIG. 1, the first lumen 105 and second lumen 110 may be coupled together at a single point at the distal end 140 of the multi-lumen extension system 100. In an embodiment, the distal end 150 of the first lumen 105 may be fluidically coupled to an interior volume of a male adapter used to interface with a female adapter of an IV device. Because, in an embodiment, the second lumen 110 is to serve as a non-fluidic channel for the patency device 125 to be housed within, the seal 120 may prevent any fluids housed within the internal volume of the male adapter from entering into the second lumen 110. In a separate embodiment, the multi-lumen extension system 100 does not include a seal 120, and the second lumen 110 may also be used as a fluidic channel to, for example, pass a blood sample through or pass infusing fluids, such as normal saline solution, various medicaments, and a total parenteral nutrition.

In an embodiment, the second lumen 110 may include a number of markers indicating a position of the patency device 125 relative to the IV catheter. In a specific embodiment, the markers may indicate to a clinician as to what position of the grip 115 along the length of the second lumen 110 causes the patency device 125 to pass completely or partially through the fluidic channels formed within the IV catheter 200.

The first lumen 105 may be optimized so that hemolysis during a blood draw is reduced. Inner diameters of the first lumen 105 and/or second lumen 110 may be optimized to provide adequate flow rates of fluids. In an embodiment, the length and inner diameters of the first lumen 105 and/or second lumen 110 may be selected based on one or more of the following: a gauge and/or length of a particular IV device, a particular IV device configuration, or a clinical setup.

Fluid flow in a lumen with a tubular fluid pathway therethrough can be analyzed using Poiseuille's equation:

$$Q = \frac{\pi D^4 \Delta P}{128 \mu L} = \frac{\Delta P}{R_f}$$

where $\Delta P$ is a change in pressure gradient across the length of the lumen, D and L are the inner diameter and length, respectively, of the tubular fluid pathway through the lumen, $\mu$ is the viscosity of a fluid, and $$R_f = \frac{128 \mu L}{\pi D^4}$$

is the fluid resistance. Since $\mu$ is the viscosity of the fluid and not part of the lumen geometry, a geometric factor $G_f$ is defined such that $R_f$ (the fluid resistance) is $$R_f = \frac{128 \mu}{\pi} G_f,$$

where $$G_f = \frac{L}{D^4}.$$

In some embodiments, the first lumen 105 and/or the second lumen 110 may include a lumen with a tubular fluid pathway.

In some embodiments, the first lumen 105 and/or the second lumen 110 may have multiple tubular sections with lengths (L1, L2, L3) and inner diameters of (D1, D2, D3), the geometric factor is then:

$$G_f = \frac{L1}{D1^4} + \frac{L2}{D2^4} + \frac{L3}{D3^4}$$

In some embodiments, the first lumen 105 and/or second lumen 110 may have an inner diameter that changes over the length of the lumen, the geometric factor is then:

$$G_f = \int_0^L \frac{dl}{D(l)^4}$$

In some embodiments, the first lumen 105 and/or second lumen 110 may have a cross section that is not circular. In this case, the geometric factor can be determined by measuring the flow rate (Q) at given pressure ($\Delta P$) with known viscosity ($\mu$) fluid:

$$G_f = \frac{\pi \Delta P}{128 \mu Q}$$

The $G_f$ value may be selected to reduce the max shear stress for each IV device gauge to be the same or less than the max shear stress of a BD 21G VACUTAINER® UTLRATOUCH™ push button blood collection set (available from Becton Dickinson & Company of Franklin Lakes, New Jersey), which was previously considered the gold standard for blood draws. In some embodiments, $G_f$ may be equal to or more than 3.83E+06 (1/in$^3$) when the IV device includes a 18G catheter, which may reduce the wall sheer stress to reduce hemolysis. In some embodiments, $G_f$ may be equal to or more than 3.27E+06 (1/in$^3$) when the IV device includes a 20G catheter, which may reduce the wall sheer stress to reduce hemolysis. In some embodiments, G may be equal to or more than 3.33E+06 (1/in$^3$) when the IV device includes a 22G catheter, which may reduce the wall sheer stress to reduce hemolysis. In some embodiments, $G_f$ may be equal to or more than 1.50E+07 (1/in$^3$) when the IV device includes a 24G catheter, which may reduce the wall sheer stress to reduce hemolysis. In some embodiments, G may include another value. In some embodiments, $G_f$ value may be selected to reduce the max shear stress for each catheter gauge to be the same or less than the max shear stress of a BD 25G VACUTAINER® ULTRATOUCH™ push button blood collection set (available from Becton Dickinson & Company of Franklin Lakes, New Jersey).

In some embodiments, a blood collection system may include one or more of the following: the IV device (which may include an extension tube), the multi-lumen extension system 100, and the needle 155. In some embodiments, the multi-lumen extension system 100 may include the first lumen 105 and/or the second lumen 110. In some embodiments, a fluid pathway of the blood collection system may include an entirety of a blood collection pathway through which blood flows during blood collection. The system geometric factor $G_{fs}$ for the fluid pathway of the blood collection system can be determined in similar fashion as described earlier. In some embodiments, the system geometric factor $G_{fs}$, when the patency device 125 may or may not be in the extended position, may be equal to or more than 7.34E+06 (1/in$^3$). In some embodiments, $G_{fs}$ may include another value. In some embodiments, the system geometric factor $G_{fs}$ may be 7.34E+06 (1/in$^3$) plus or minus 10 percent, plus or minus 25 percent, plus or minus 50 percent, or plus or minus 75 percent. In some embodiments, $G_{fs}$ may include another value, which may be selected based on a gauge and/or length of the catheter.

The multi-lumen extension system 100 may minimize hemolysis during a blood draw while also allowing for the patency of an IV catheter coupled to the multi-lumen extension system 100. The multi-lumen extension system optimizes blood flow rate during a blood collection process while improving IV catheter indwelling at the patient's blood vessel.

Although the present disclosure describes an IV catheter, the present specification contemplates that the IV catheter is a peripheral IV catheter (PIVC). In an embodiment, the PIVC includes a needless access connector (NAC) attached to a near patient access luer port on the multi-lumen extension system. In an embodiment, the PIVS includes a NAC that is attached to a near patient access luer port with a non-integrate VAD.

In an embodiment, the second lumen 110 may include a vent that allows the passage of air. In some embodiments, as the grip is used to pass the patency device 125 therethrough, the air may be compressed. With the inclusion of a vent, the compressed air may escape from the second lumen 110.

Figure 2:
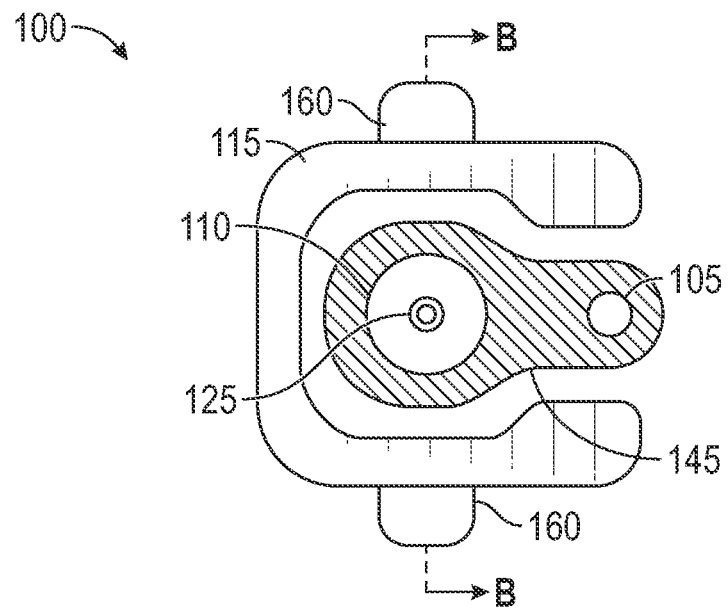
FIG. 2 is a side elevation, section view of a multi-lumen extension system according to an embodiment of the present disclosure.

FIG. 1 also shows a section line "A." The section line "A" shows the view as depicted, in an embodiment, of the multi-lumen extension system 100 in FIG. 2. FIG. 2 is a side elevation, section view of a multi-lumen extension system 100 according to an embodiment of the present disclosure. This view in FIG. 2 shows the grip 115 wrapped, at least, partially around the first lumen 105 and second lumen 110 of the multi-lumen extension system 100. In the side elevation, section view of the multi-lumen extension system 100 illustrated in FIG. 2, the grip 115 may be placed at any distance along the first lumen 105 and second lumen 110. The views presented in FIG. 1 illustrates the placement of the grip 115 at a most-proximal end of the multi-lumen extension system 100. However, the placement of the grip 115 in FIG. 1 is merely an example position relative to the first lumen 105 and second lumen 110 and it is understood that the view presented in FIG. 2 may be along any location of the first lumen 105 and second lumen 110. In this specific example, a multi-lumen tube 145 includes voids that form the first lumen 105 and second lumen 110 along the length of the multi-lumen tube 145. The present description, however, contemplates that the multi-lumen tube 145 may be a separate tubing that is formed around and coaxial with the first lumen 105 and second lumen 110 which both include a separate tubing as described above in connection with FIG. 1. The section line "A" shows that the patency device 125 runs coaxial within the second lumen 110. Also, the first lumen 105 runs generally parallel with the second lumen 110 and its patency device 125.

The grip 115 may also include a number of fingers 160 protruding from the grip 115. The fingers 160 may be used by a clinician to better interface with the grip 115 so that the clinician may drag the grip 115 towards or away from a distal end 140 of the multi-lumen extension system 100 to selectively extend and withdraw the patency device 125 placed within the second lumen 110.

Figure 3:
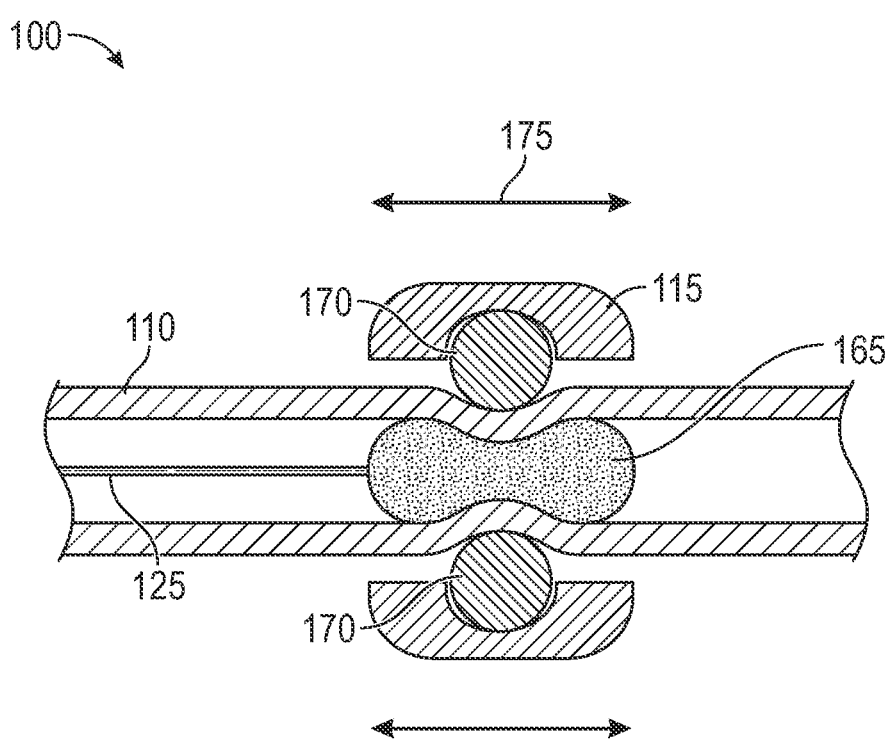
FIG. 3 is a front elevation, section view of a multi-lumen extension system according to an embodiment of the present disclosure.

FIG. 2 also shows a section line "B." The section line "B" shows the view as depicted, in an embodiment, of the multi-lumen extension system 100 in FIG. 3. FIG. 3 is a front elevation, section view of multi-lumen extension system 100 according to an embodiment of the present disclosure. FIG. 3 specifically shows a section of the second lumen 110 that houses the patency device 125 therein. Because the patency device 125 is maintained, in this embodiment, within the second lumen 110, the grip 115 is formed so as to interface with the patency device 125 through the outer walls of the second lumen 110. In the specific example illustrated in FIG. 3, the patency device 125 includes a hub 165 that includes a surface that interface and engages with a plurality of ball bearings 170. Although the embodiments presented herein describe the use of ball bearings 170, the present specification contemplates that other types of devices such as rollers and other low-friction sliding surfaces may be used the present specification contemplates the use of these various other devices without going beyond the scope of the principles described herein. In the embodiment shown in FIG. 3, the surface of the hub 165 of the patency device 125 that interfaces with the ball bearings 170 may include a concave portion that is fitted to interface with the ball bearings 170.

In an embodiment, the ball bearings 170 are placed along an outer wall of the second lumen 110 so that the ball bearings 170 press against the outer wall of the second lumen 110 via compression from the grip 115 formed coaxially around, at least, the second lumen 110. The surface of the hub 165 placed around the patency device 125 may conform to the spherical surfaces of the ball bearings 170 such that translation of the ball bearings 170 along the outer wall of the second lumen 110 by the grip 115 causes movement of the surface of the hub 165 and its attached patency device 125 within the second lumen 110. The translation direction of the grip 115, ball bearings 170, surface of the hub 165, and patency device 125 may be in the directions as depicted by bi-directional arrow 175. As described herein, the second lumen 110 may include a vent that allows air to pass out of the second lumen 110 as the hub 165 passes through the second lumen 110. In an embodiment, the interface between the second lumen and the ball bearings 170 may form a seal at the grip 115. With the movement of the seal between the hub 165 and the ball bearings 170, air may be compressed within the second lumen 110 and the air may escape via the vent.

In an embodiment, the grip 115 may include an amount of lubricant placed near the ball bearings 170 to allow for translation of the grip 115 along the second lumen 110. In a specific embodiment, the lubricant may be placed along an interface between the ball bearings 170 and outer wall of the second lumen 110 and/or the interface between the ball bearings 170 and an interior surface of the grip 115. In an embodiment, a lubricant may also be included between the hub 165 and an inner diameter of the second lumen.

Figure 4:
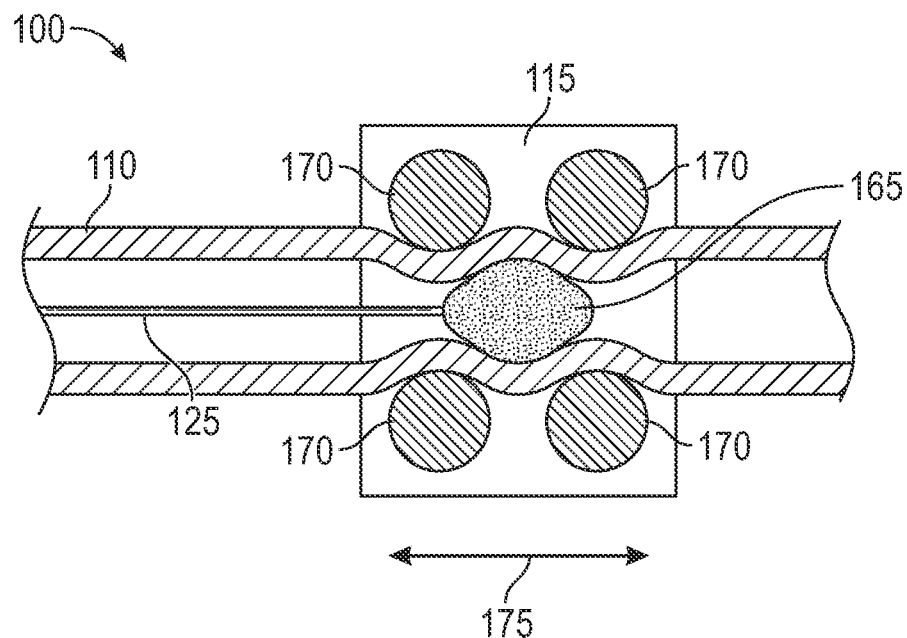
FIG. 4 is a front elevation, section view of a multi-lumen extension system according to an embodiment of the present disclosure.

FIG. 4 is a front elevation, section view of a multi-lumen extension system according to an embodiment of the present disclosure. Similar to FIG. 3, FIG. 4 is a front elevation, section view along section line "B" shown in FIG. 2 according to an embodiment of the present disclosure. In this embodiment illustrated in FIG. 4, the grip 115 may include more ball bearings 170 than is illustrated in FIG. 3: specifically, four ball bearings 170.

The surface of the hub 165 of the patency device 125 illustrated in FIG. 4 interfaces with the four ball bearings 170 with the ball bearings 170 encompassing the surfaces rather than being placed within a concave portion as depicted in FIG. 3. FIG. 4 illustrates a patency device 125 interface that is concave such that the ball bearings 170 encompass the surface of the hub 165 of the patency device 125.

In an embodiment, the ball bearings 170 are placed along an outer wall of the second lumen 110 so that the ball bearings 170 press against the outer wall of the second lumen 110 via compression from the grip 115 formed coaxially around, at least, the second lumen 110. The surface of the hub 165 placed around the patency device 125 may conform to the spherical surfaces of the ball bearings 170 such that translation of the ball bearings 170 along the outer wall of the second lumen 110 by the grip 115 causes movement of the hub 165 and its attached patency device 125 within the second lumen 110. The translation direction of the grip 115, ball bearings 170, hub 165, and patency device 125 may be in the directions as depicted by bi-directional arrow 175.

In an embodiment, the grip 115 may include an amount of lubricant placed near the ball bearings 170 to allow for a translation of the grip 115 along the second lumen 110. In a specific embodiment, the lubricant may be placed along an interface between the ball bearings 170 and outer wall of the second lumen 110 and/or the interface between the ball bearings 170 and an interior surface of the grip 115.

Figure 5:
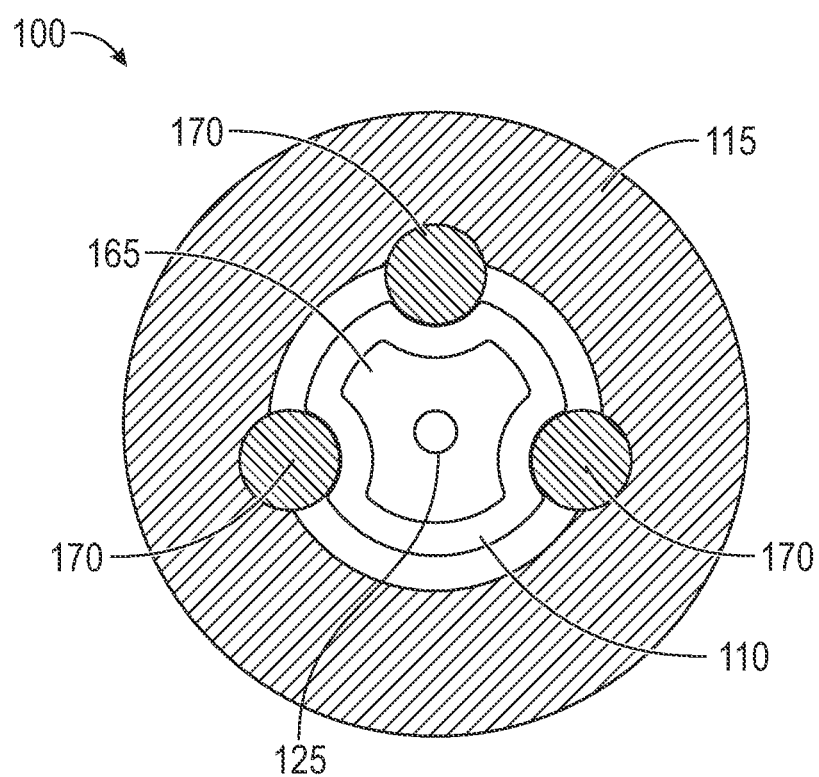
FIG. 5 is a side elevation, section view of a multi-lumen extension system according to an embodiment of the present disclosure.

FIG. 5 is a side elevation, section view of a multi-lumen extension system 100 according to an embodiment of the present disclosure. Similar to FIG. 2, FIG. 5 is a section view according to an embodiment of the present disclosure. In the side elevation, section view of the multi-lumen extension system 100 illustrated in FIG. 5, the grip 115 may be placed at any distance along the first lumen 105 and second lumen 110. The views presented in FIG. 1, for example, illustrates the placement of the grip 115 at a most-proximal end of the multi-lumen extension system 100. However, the placement of the grip 115 in FIG. 1 is merely an example position relative to the first lumen 105 and second lumen 110 and it is understood that the view presented in FIG. 5 may be along any location of the first lumen 105 and second lumen 110. In the embodiment illustrated in FIG. 5, the patency device 125 may include a surface of the hub 165 that has three separate concave portions that each interface with a ball bearing 170. In this embodiment, the surface of the hub 165 may be formed into a three-lobed surface of the hub 165 that hold the ball bearings 170 between the grip 115 and the outer wall of the second lumen 110. The present disclosure, however, contemplates that any number of ball bearings 170 may be used to interface in any manner with the surface of the hub 165 of the patency device 125 through the outer wall of the second lumen 110.

Figure 6:
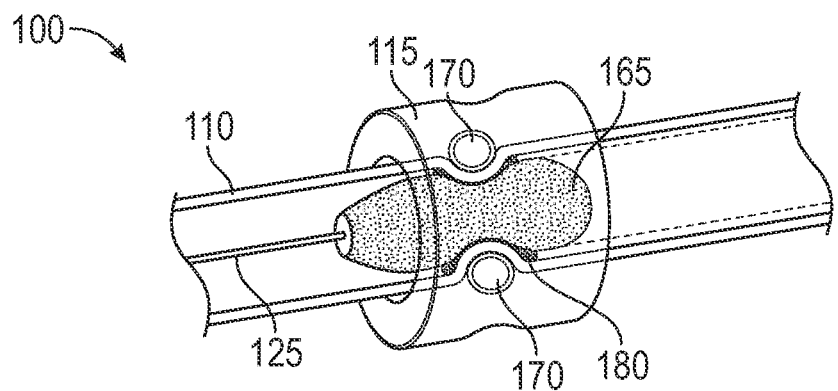
FIG. 6 is a perspective view of a multi-lumen extension system according to an embodiment of the present disclosure.

FIG. 6 is a perspective view of a multi-lumen extension system 100 according to an embodiment of the present disclosure. In this embodiment, the grip 115 may include a concave surface that allows a clinician or other HCP to interact with the grip 115 so as to translate the grip 115, the hub 165, the ball bearings 170 and the patency device 125 along the length of the second lumen 110.

In the embodiment shown in FIG. 6, the surface of the hub 165 of the patency device 125 may also be concave so as to receive the ball bearings 170 as described herein. In an embodiment, an amount of lubricant may be placed near the ball bearings 170 to allow for translation of the grip 115 along the second lumen 110. In a specific embodiment, the lubricant may be placed along an interface between the ball bearings 170 and outer wall of the second lumen 110 and/or the interface between the ball bearings 170 and an interior surface of the grip 115.

FIG. 6 shows an embodiment wherein the grip 115 fully surrounds, coaxially, the second lumen 110. In this embodiment, the first lumen 105 may be placed separate from the second lumen 110 with no multi-lumen tube 145 formed, coaxially, around the first lumen 105 and second lumen 110. The present description, however, contemplates that the grip 115 may be formed partially around the second lumen 110 with the second lumen 110 lying generally parallel with the first lumen 105 and housed within the multi-lumen tube 145 as described in some embodiments herein.

Figure 7:
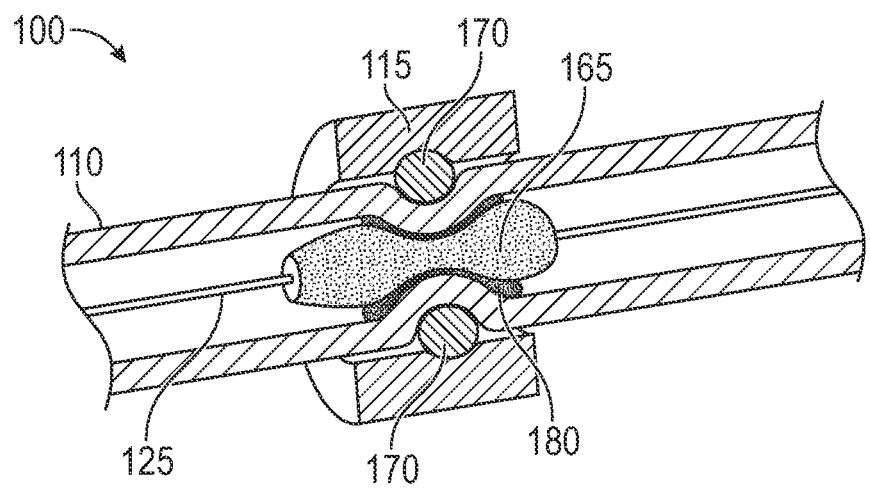
FIG. 7 is a section, perspective view of a multi-lumen extension system according to an embodiment of the present disclosure.

FIG. 7 is a section, perspective view of a multi-lumen extension system 100 according to an embodiment of the present disclosure. FIG. 7 illustrates a grip 115 interfacing with a surface of the hub 165 via the ball bearings 170 and through the second lumen 110. In this embodiment, the grip 115 surrounds, coaxially, the second lumen 110. Similar to FIG. 6, the first lumen 105 may be placed separate from the second lumen 110 with no multi-lumen tube 145 formed, coaxially, around the first lumen 105 and second lumen 110.

FIG. 7, in an embodiment, illustrates a placement of a lubricant 180 by the hub 165 of the patency device 125. In this embodiment, the lubricant 180 may be spread throughout the hollow of the second lumen 110 upon movement of the hub 165 and patency device 125 within the second lumen 110. In this embodiment, a seal (not shown) placed at a distal end of the second lumen 110 so that any lubricant placed within the hollow of the second lumen 110 does not escape the second lumen 110 and contaminate a blood sample received at a distal end of the first lumen or an infusing fluid, such as normal saline solution, various medicaments, and total parenteral nutrition exiting from the distal end of the first lumen. In an embodiment, the lubricant 180 may be placed at or around the ball bearings 170 placed between the outer surface of the second lumen 110 and the grip 115. In this embodiment, any number of seals may be coupled to the grip 115 to contain the lubricant 180 between the grip 115 and ball bearings 170 with little or no spreading along the outer surface of the second lumen 110 during actuation of the grip 115 by the clinician. The lubricant 180 may be placed at multiple locations in order to facilitate the ease of movement of the grip 115 along the length of the second lumen 110 and the present description contemplates these multiple locations.

Figure 8:
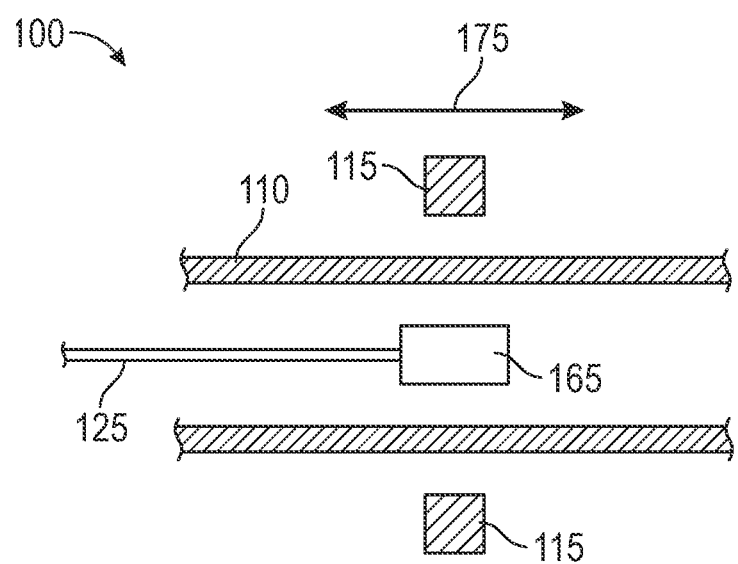
FIG. 8 is a front elevation, section view of a multi-lumen extension system according to an embodiment of the present disclosure.

FIG. 8 is a front elevation, section view of a multi-lumen extension system 100 according to an embodiment of the present disclosure. In this embodiment, the hub 165 of the patency device 125 is magnetized and, in an embodiment, may be made of a ferromagnetic material that is magnetized and affixed to a proximal end of the patency device 125. In this embodiment, the hub 165 may be maintained at a position within the second lumen 110 through the use of a grip 115 that is also magnetized or is formed out of a magnetized ferromagnetic material as well.

In an embodiment, the grip 115 may be a ring of ferromagnetic material that has been magnetized to repel or attract the magnetized hub 165 at all directions coaxial from the hub 165. The magnetized hub 165 may, due to the equal repelling or attraction of the hub 165 at all coaxial angles from the hub 165, be maintained at a central location within the second lumen 110 where the hub 165 has a smaller radial dimension than the internal hollow of the second lumen 110 as shown in FIG. 8. The movement of the hub 165 and patency device 125 may be accomplished through the movement of the grip 115 in the directions as depicted by bi-directional arrow 175 as described herein.

Figure 9:
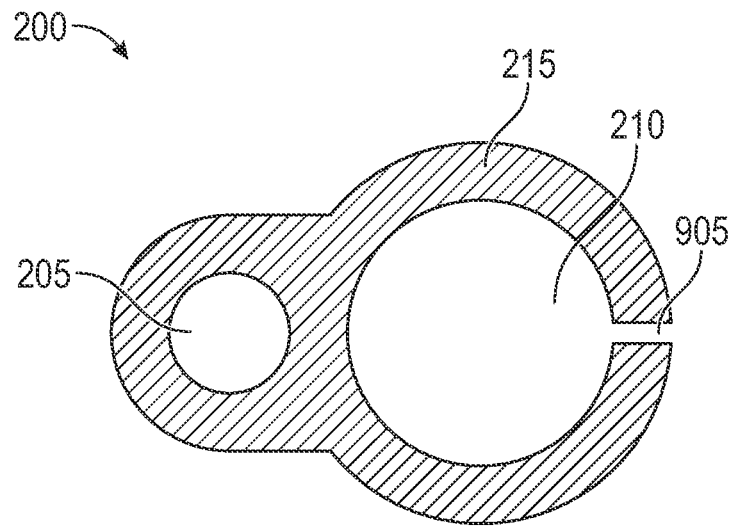
FIG. 9 is a side elevation view of a rigid multi-lumen extension system according to an embodiment of the present disclosure.

FIG. 9 is a side elevation view of a rigid multi-lumen extension system 200 according to an embodiment of the present disclosure. In an embodiment, the rigid multi-lumen extension system 200 includes a first lumen 205 and a second lumen 210. Unlike FIG. 1, the rigid multi-lumen extension system 200 is made of a rigid material such that the first lumen 205 and second lumen 110 is formed through the rigid material. The first lumen 205 may be formed along the entire length of the rigid multi-lumen extension system 200 from a proximal end of the rigid multi-lumen extension system 200 to a distal end of the rigid multi-lumen extension system 200 where, in an embodiment, the first lumen 205 is fluidically coupled to an IV device via, for example, a male connector as described herein. The embodiments presented herein, may refer to the rigid multi-lumen extension system 200 as being made of a rigid material. The present specification, however, contemplates the use of various other materials that are rigid, semi-rigid, or flexible without going beyond the scope of the principles described herein.

The rigid multi-lumen extension system 200 may include, in the embodiment illustrated in FIG. 9, includes an open second lumen 210. Unlike FIG. 1, because the rigid multi-lumen extension system 200 is made of a rigid material, the walls of the second lumen 210 may remain in position such that they do not collapse in on itself. The open second lumen 210 may be a non-fluidic channel that allows a grip (not shown) to access a patency device (not shown) formed within the second lumen 210. In this example, the grip may be mechanically coupled to the patency device such that movement of the grip along the length of the second lumen 210 causes the patency device to also be moved within the second lumen 210. The rigidity of the rigid multi-lumen extension system 200 may allow a clinician to grip the rigid multi-lumen extension system 200 with one hand while actuating the grip 215.

In order to allow for the mechanical coupling of the grip to the hub of the patency device, the second lumen 210 may include a via 905 formed longitudinally through the second lumen 210. This via 905 may be sized to allow for an arm coupling the grip to the hub to pass therethrough.

Figure 10:
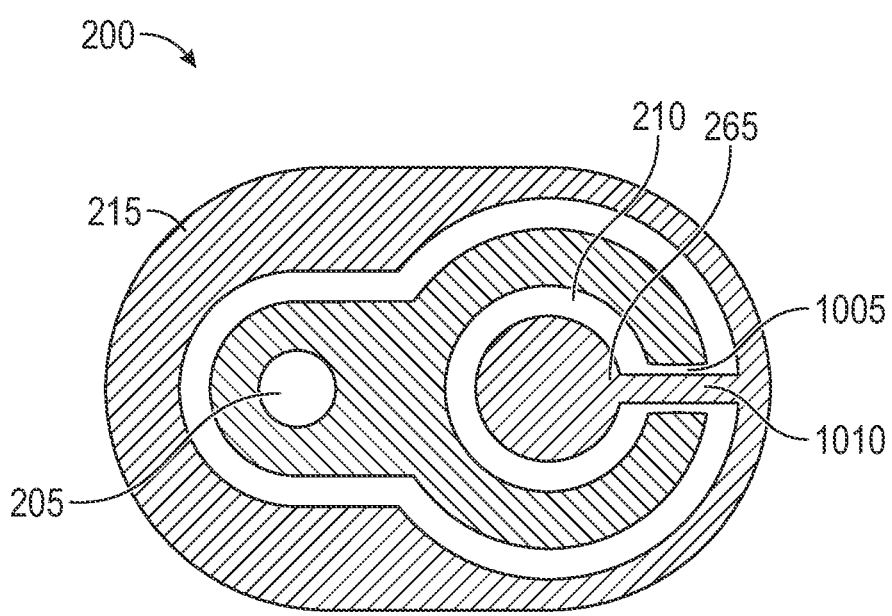
FIG. 10 is a side elevation, section view of a rigid multi-lumen extension system according to an embodiment of the present disclosure.

FIG. 10 is a side elevation view of a rigid multi-lumen extension system 200 according to an embodiment of the present disclosure. The rigid multi-lumen extension system 200 in this embodiment includes a grip 215 that surrounds a length of the rigid multi-lumen extension system 200. In the embodiment of FIG. 10, the rigid multi-lumen extension system 200 includes a first lumen 205 and a second lumen 210. The first lumen 205 may be formed along the entire length of the rigid multi-lumen extension system 200 from a proximal end of the rigid multi-lumen extension system 200 to a distal end of the rigid multi-lumen extension system 200 where, in an embodiment, the first lumen 205 is fluidically coupled to an IV device via, for example, a male connector as described herein.

FIG. 10 illustrates an open second lumen 210 including a via 1005. In this embodiment, the grip 215 includes an arm 1010 that extends through the via 1005 and attaches to the hub 265 of the patency device (not shown). The arm 1010 may form, in an embodiment, a portion of a monolithically-formed grip 215 that includes, as a single piece, the patency device, the hub 265 of the patency device, the arm 1010, and the grip 215 as illustrated in FIG. 10.

The grip 215 and the rigid multi-lumen extension system 200 may have a general shape of an oval when viewed on the section view as shown in FIG. 10. However, the present description contemplates that other shapes and forms of the hub 265 and the rigid multi-lumen extension system 200 may be formed.

Figure 11:
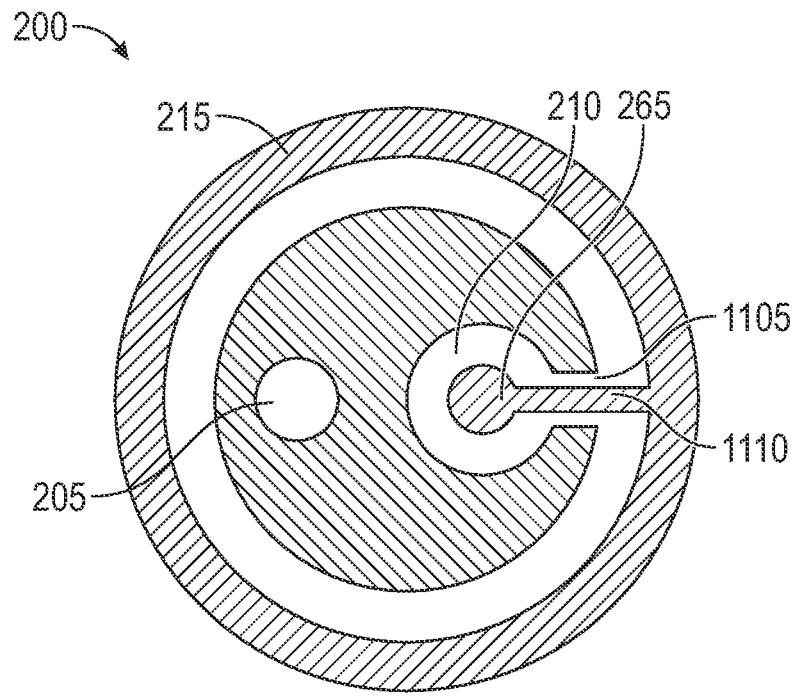
FIG. 11 is a side elevation, section view of a rigid multi-lumen extension system according to an embodiment of the present disclosure.

FIG. 11 is a side elevation, section view of a rigid multi-lumen extension system 200 according to an embodiment of the present disclosure. The rigid multi-lumen extension system 200 in this embodiment includes a grip 215 that surrounds a length of the rigid multi-lumen extension system 200. In the embodiment of FIG. 11, the rigid multi-lumen extension system 200 includes a first lumen 205 and a second lumen 210. The first lumen 205 may be formed along the entire length of the rigid multi-lumen extension system 200 from a proximal end of the rigid multi-lumen extension system 200 to a distal end of the rigid multi-lumen extension system 200 where, in an embodiment, the first lumen 205 is fluidically coupled to an IV device via, for example, a male connector as described herein.

FIG. 11 illustrates an open second lumen 210 including a via 205. In this embodiment, the grip 215 includes an arm 1110 that extends through the via 1105 and attaches to the hub 265 of the patency device (not shown). The arm 1110 may form, in an embodiment, a portion of a monolithically-formed grip 215 that includes, as a single piece, the patency device, the hub 265 of the patency device, the arm 1110, and the grip 215 as illustrated in FIG. 11.

The grip 215 and the rigid multi-lumen extension system 200 may have a general shape of a circle when viewed on the section view as shown in FIG. 11. However, the present description contemplates that other shapes and forms of the hub 265 and the rigid multi-lumen extension system 200 may be formed.

Figure 12:
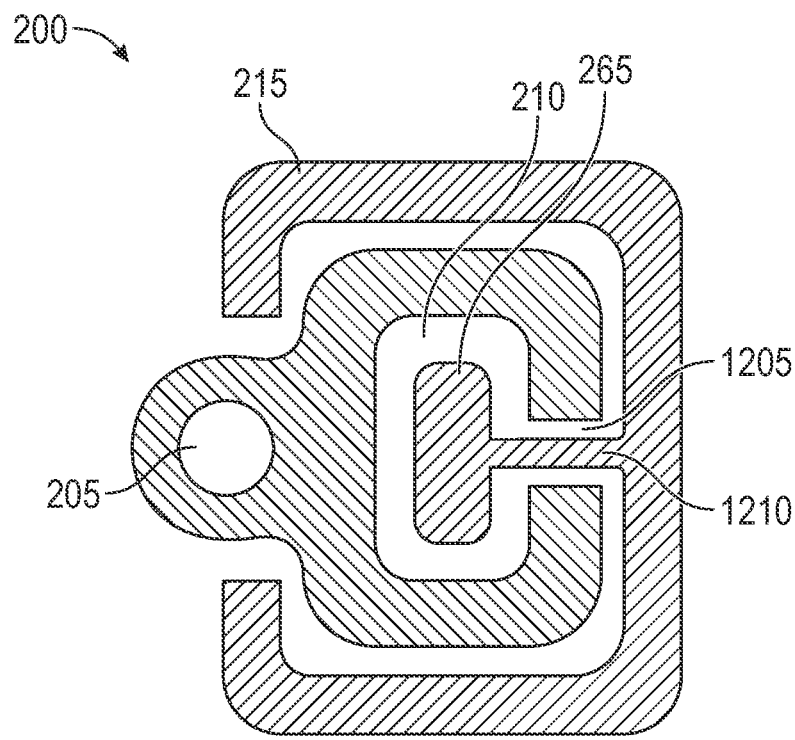
FIG. 12 is a side elevation, section view of a rigid multi-lumen extension system according to an embodiment of the present disclosure.

FIG. 12 is a side elevation, section view of a rigid multi-lumen extension system 200 according to an embodiment of the present disclosure. The rigid multi-lumen extension system 200 in this embodiment includes a grip 215 that partially surrounds a length of the rigid multi-lumen extension system 200. In the embodiment of FIG. 12, the rigid multi-lumen extension system 200 includes a first lumen 205 and a second lumen 210. The first lumen 205 may be formed along the entire length of the rigid multi-lumen extension system 200 from a proximal end of the rigid multi-lumen extension system 200 to a distal end of the rigid multi-lumen extension system 200 where, in an embodiment, the first lumen 205 is fluidically coupled to an IV device via, for example, a male connector as described herein.

FIG. 12 illustrates an open second lumen 210 including a via 1205. In this embodiment, the grip 215 includes an arm 1210 that extends through the via 1205 and attaches to the hub 265 of the patency device (not shown). The arm 1210 may form, in an embodiment, a portion of a monolithically-formed grip 215 that includes, as a single piece, the patency device, the hub 265 of the patency device, the arm 1210, and the grip 215 as illustrated in FIG. 12.

The grip 215 and the rigid multi-lumen extension system 200 may have a general shape of a square when viewed on the section view as shown in FIG. 11. In this embodiment, the first lumen 205 may extend outside of the surrounding grip 215. However, the present description contemplates that other shapes and forms of the hub 265 and the rigid multi-lumen extension system 200 may be formed.

Figure 13:
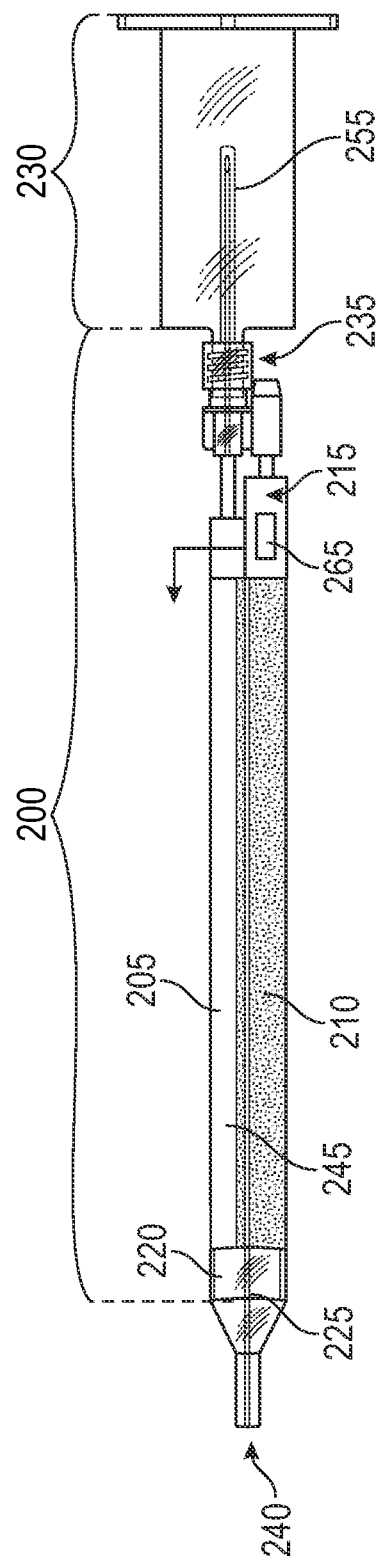
FIG. 13 is a front elevation view of a multi-lumen extension system according to an embodiment of the present disclosure.

FIG. 13 is a front elevation view of a multi-lumen extension system 200 according to an embodiment of the present disclosure. In the embodiment shown in FIG. 13, the rigid multi-lumen extension system 200 is coupled to a LLAD 230 at a proximal end of the rigid multi-lumen extension system 200 and fluidically coupled to a proximal end 135 of the first lumen 105. Again, the embodiments presented herein, may refer to the rigid multi-lumen extension system 200 as being made of a rigid material. The present specification, however, contemplates the use of various other materials that are rigid, semi-rigid, or flexible without going beyond the scope of the principles described herein.

As described herein, the multi-lumen extension system 200 may include a first lumen 205 and a second lumen 210. In an embodiment, the first lumen 205 may be a fluidic channel through which blood, a flushing agent, an infusing fluid such as normal saline solution, various medicaments, and/or total parenteral nutrition may be passed through. In an embodiment, the first lumen 205 may be fluidically coupled, at a proximal end 235 of the first lumen 205, to a fluidic source or the LLAD 230 as described herein. The LLAD 230 may include a needle 255 to interface with, for example, a blood sample tube such as a VACUTAINER® blood sample collection tube produced by Becton, Dickinson and Company. Although the present description describes the first lumen 205 as being fluidically coupled to a LLAD 230, the present description contemplates that any fluidic sampling device or fluid reservoir may be coupled to the proximal end 235 of the first lumen 205 so as to sample blood or provide infusing fluids, such as normal saline solution, various medicaments, and total parenteral nutrition.

In an embodiment, the first lumen 205 may be fluidically coupled to an IV device at a distal end 240 of the multi-lumen extension system 200 via a distal end 250 of the first lumen 205. The distal end 240 of the multi-lumen extension system 200 may also include a connector used to couple the multi-lumen extension system 200 to the IV device. In an example, the distal end 240 of the multi-lumen extension system 200 includes a male adapter used to interface with a female component on the IV device. The male adapter may allow for a distal end 250 of the first lumen 205 to exit into a hollow formed within the male adapter. The distal end 240 of the multi-lumen extension system 200 may further include a number of coupling mechanisms that couple the distal end 240 of the multi-lumen extension system 200 to the IV device as described herein.

The multi-lumen extension system 200 also includes a second lumen 210. In the embodiment shown in FIG. 13, the second lumen 210 lies, generally, parallel with the first lumen 205. In an embodiment, a multi-lumen tube 245 may be used to house the first lumen 205 and second lumen 210. This multi-lumen tube 245 may be coaxially formed around the first lumen 205 and second lumen 210 so that these lumens 205, 210 may be organized at a single location for access by a clinician or other HCP. The multi-lumen tube 245 may, in this embodiment, form part of a structure used to couple the first lumen 205 and second lumen 210 to the distal end 240 of the multi-lumen extension system 200 and a proximal end of the multi-lumen extension system 200 such as the proximal end 235 of the first lumen 205.

The multi-lumen extension system 200 may include, in some embodiments, a grip 215. The grip 215 may be any device that is operatively coupled to a hub 265 formed on the patency device 225 and placed coaxially within the second lumen 210. The grip 215 may be actuated by a clinician or other HCP to cause the patency device 225 to be selectively advanced or translated within the second lumen 210 and cause a portion of the patency device 225 to extend out of a distal end 240 of the multi-lumen extension system 200. As described herein, the multi-lumen extension system 200 may be coupled to an IV device that is placed within a patient's blood vessel. The advancement of the patency device 225 by the actuation of the grip 215 causes the patency device 225 to extend out of the second lumen 210 and through any fluidic channels formed in the IV device so as to dislodge any obstructions or check the patency of the IV device. During operation of the multi-lumen extension system 200, the clinician may selectively drag the grip 215 towards the distal end 240 of the multi-lumen extension system 200 to extend the patency device 225 out of the multi-lumen extension system 200. The clinician may also drag the grip 215 towards the proximal end 235 of the first lumen 205 and multi-lumen extension system 200 to retract the patency device 225 back into the second lumen 210 to allow for subsequent patency checks or fluid transfers through the multi-lumen extension system 200 via the first lumen 205.

In an embodiment, the multi-lumen extension system 200 may include a seal 220. The seal 220 may be used to fluidically seal the second lumen 210 from the fluids passing through the first lumen 205 and through a distal end 240 of the multi-lumen extension system 200. As described herein and illustrated in FIG. 13, the first lumen 205 and second lumen 210 may be coupled together at a point at the distal end 240 of the multi-lumen extension system 200. In an embodiment, the distal end 250 of the first lumen 205 may be fluidically coupled to an interior volume of a male adapter used to interface with a female adapter of an IV device. Because, in an embodiment, the second lumen 210 is to serve as a non-fluidic channel for the patency device 225 to be housed within, the seal 220 may prevent any fluids housed within the internal volume of the male adapter from entering into the second lumen 210. In a separate embodiment, the multi-lumen extension system 200 does not include a seal 220, and the second lumen 210 may also be used as a fluidic channel to, for example, pass a blood sample through or pass infusing fluids, such as normal saline solution, various medicaments, and a total parenteral nutrition.

Figure 14:
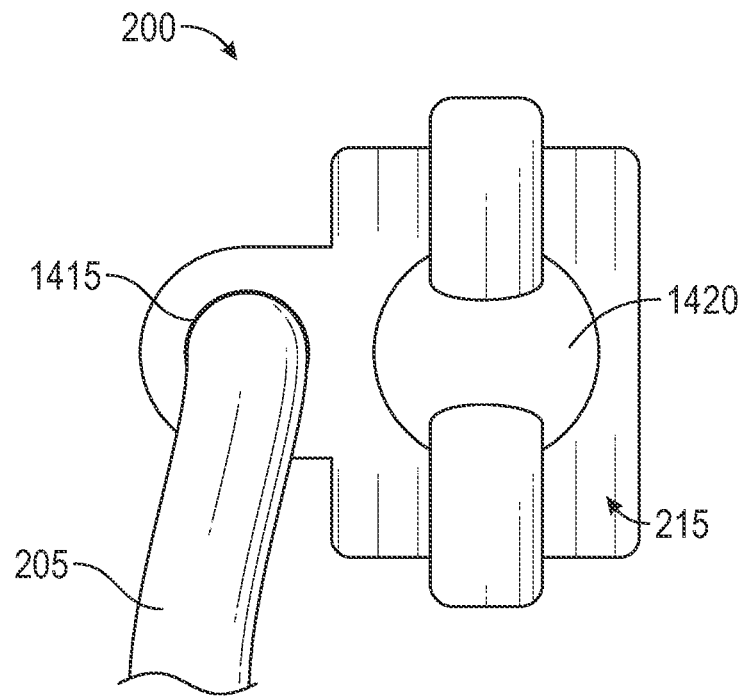
FIG. 14 is a side elevation view of a grip according to an embodiment of the present disclosure.
Figure 15:
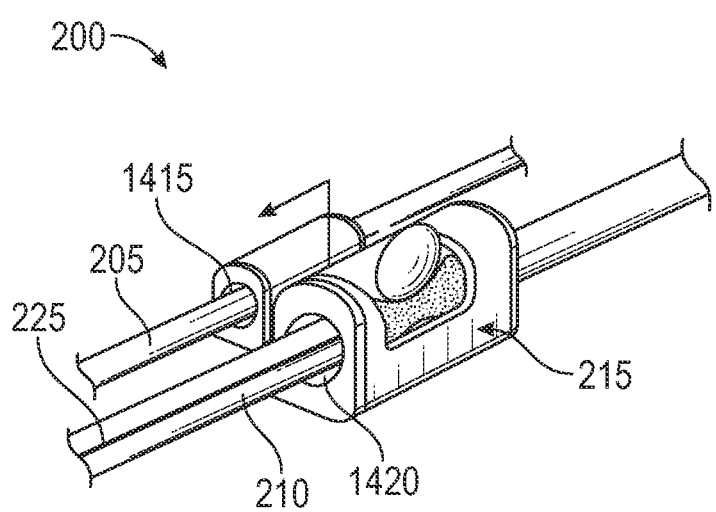
FIG. 15 is a perspective view of a multi-lumen extension system according to an embodiment of the present disclosure.

As illustrated in FIG. 13, the grip 215 may physically couple the first lumen 205 to the second lumen 210. This embodiment is shown in further detail in FIGS. 14 and 15. FIG. 14 is a side elevation view of a grip 215 according to an embodiment of the present disclosure. FIG. 15 is a perspective view of a multi-lumen extension system 200 according to an embodiment of the present disclosure. The grip 215 may include a first via 1415 through which the first lumen 205 may pass. The diameter of the first via 1415 may be sufficient to allow for the first lumen 205 to slide through therethrough without adding a significant amount of friction that may increase the difficulty in moving the grip 215 along the first lumen 205.

The grip 215 also includes a second via 1420. The second via 1420 may be sized to allow a second lumen 210 to pass therethrough. The diameter of the second via 1420 may be sufficient to allow for the second lumen to slide through therethrough without adding a significant amount of friction that may increase the difficulty in moving the grip 215 along the second lumen.

The grip 215 may also include a patency coupling device that allows the clinician or other HCP to move the patency device 225 within the second lumen. As illustrated in FIG. 15, the first lumen 205 and second lumen 210 are shown passing through the first via 1415 and second via 1420, respectively. The grip 215 may be physically or operatively coupled to the patency device 225 within the second lumen 210 as described herein. In this example, the grip 215 functionally secures the first lumen 205 to the second lumen 210 so that the movement of the grip 215 occurs only by passing both the first lumen 205 and second lumen 210 through the first via 1415 and second via 1420 respectively. Again, movement of the grip 215 causes the patency device 225 to move within the second lumen 210 and out of the rigid multi-lumen extension system 200 as described herein.

Figure 16:
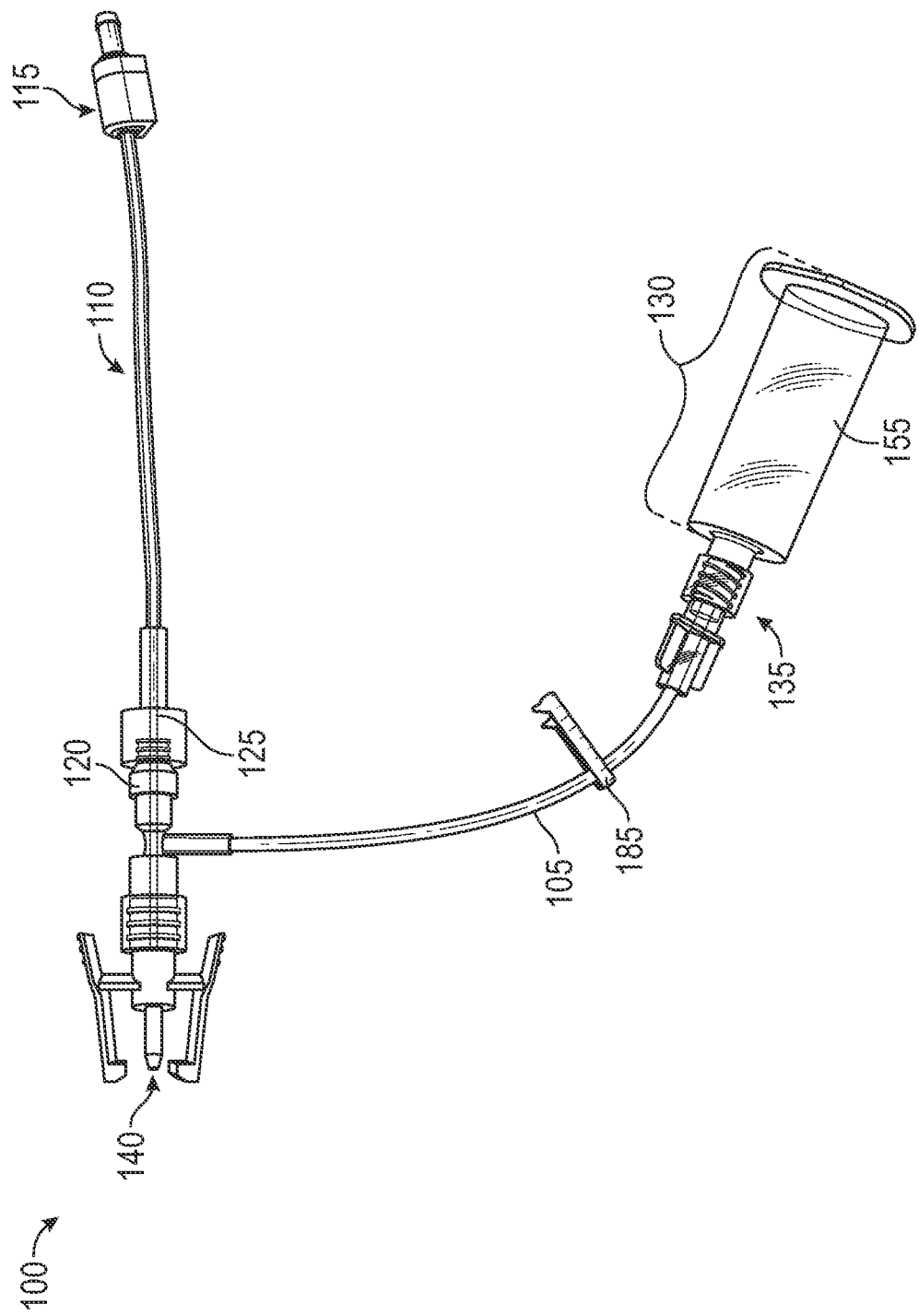
FIG. 16 is a top plan view of a multi-lumen extension system according to an embodiment of the present disclosure.
Figure 17:
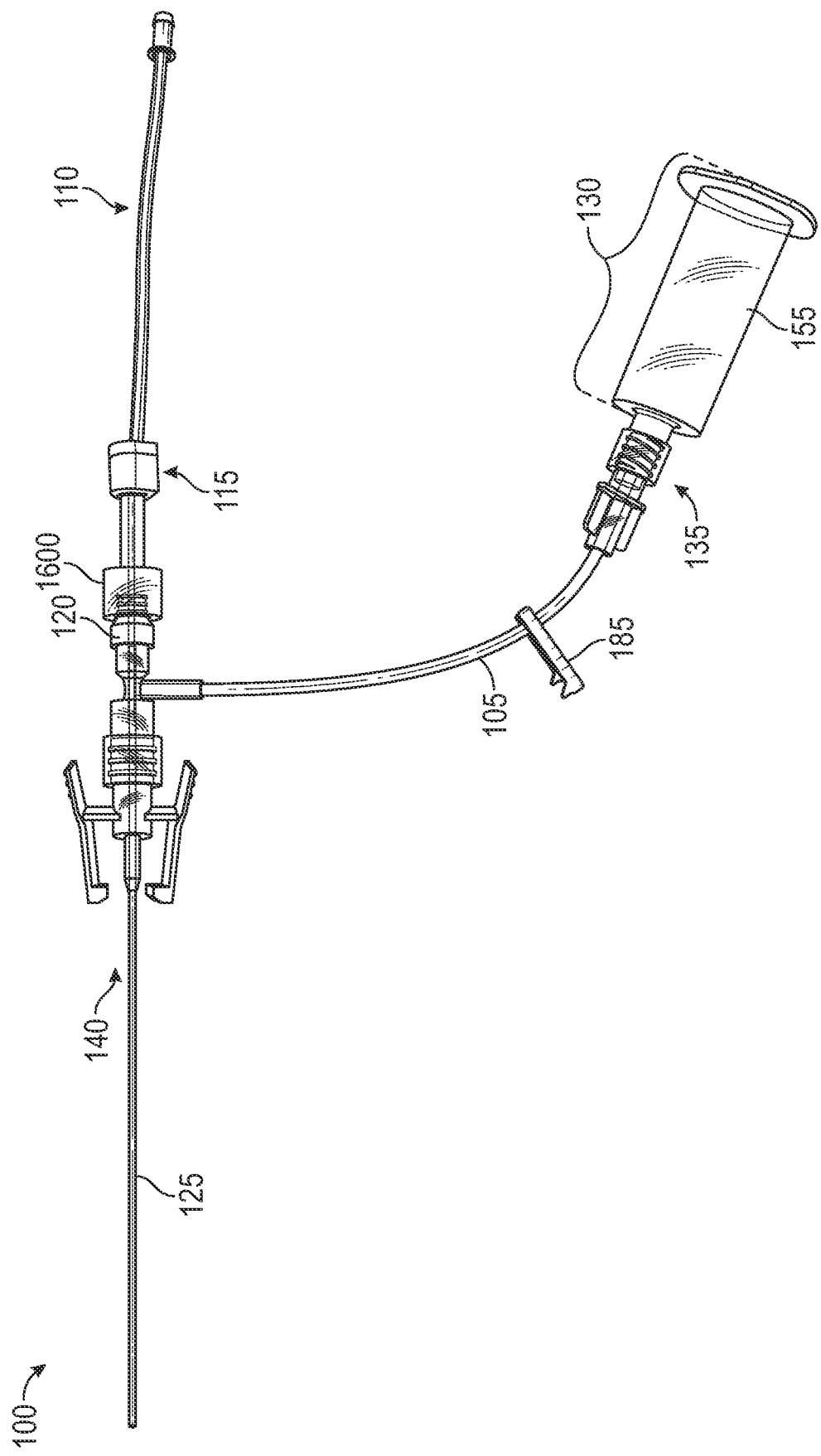
FIG. 17 is a top plan view of a multi-lumen extension system according to an embodiment of the present disclosure.

FIG. 16 is a top plan view of a multi-lumen extension system 100 with the patency device 125 placed in a first state according to an embodiment of the present disclosure. FIG. 17 is a top plan view of a multi-lumen extension system 100 with the patency device 125 placed in a second state according to an embodiment of the present disclosure. Referring to FIGS. 16 and 17, the multi-lumen extension system 100 may include a first lumen 105 and a second lumen 110. In an embodiment, the first lumen 105 may be a fluidic channel through which blood, a flushing agent, an infusing fluid such as normal saline solution, various medicaments, and/or total parenteral nutrition may be passed through. In an embodiment, the first lumen 105 may be fluidically coupled, at a proximal end 135 of the first lumen 105, to a fluidic source. In an embodiment, the proximal end 135 of the first lumen 105 may be coupled to a LLAD 130. The LLAD 130 may include a needle 155 to interface with, for example, a blood sample tube such as a VACU-TAINER® blood sample collection tube produced by Becton, Dickinson and Company. Although the present description describes the first lumen 105 as being fluidically coupled to a LLAD 130, the present description contemplates that any fluidic sampling device or fluid reservoir may be coupled to the proximal end 135 of the first lumen 105 so as to sample blood or provide infusing fluids, such as normal saline solution, various medicaments, and total parenteral nutrition.

In an embodiment, the first lumen 105 may be fluidically coupled to an IV device (not shown) at a distal end 140 of the multi-lumen extension system 100 via a distal end 150 of the first lumen 105. The distal end 140 of the multi-lumen extension system 100 may also include a connector used to couple the multi-lumen extension system 100 to the IV device. In the specific example shown in FIGS. 16 and 17, the distal end 140 of the multi-lumen extension system 100 includes a male adapter used to interface with a female component on the IV device. The male adapter may allow for a distal end 150 of the first lumen 105 to exit into a hollow formed within the male adapter.

The distal end 140 of the multi-lumen extension system 100 may further include a number of coupling mechanisms that couple the distal end 140 of the multi-lumen extension system 100 to the IV device. Although FIGS. 16 and 17 show that the distal end 140 includes a male adapter and coupling mechanisms used to interface with a female adapter on an IV device, the present description contemplates that other types of adapters (including a female adapter) may be used to couple the distal end 140 of the multi-lumen extension system 100 an IV device.

The multi-lumen extension system 100 also includes a second lumen 110. In the embodiment shown in FIGS. 16 and 17, the second lumen 110 lies, generally, perpendicularly to the first lumen 105. In the examples presented in FIGS. 16 and 17, a distal end of the first lumen 105 and a distal end of the second lumen 110 may intersect at a location distal to a seal 120 formed at a distal end of the second lumen 110. In this embodiment, the patency device 125 may extend a distance past the seal 120 but not out of the multi-lumen extension system 100 in a first state as shown in FIG. 16. In a second state shown in FIG. 17, the patency device 125 may extend out of the multi-lumen extension system 100 as the grip 115 is moved towards a distal end 140 of the multi-lumen extension system 100 as described herein. The non-parallel or perpendicular orientation of the first lumen 105 relative to the second lumen 110 may allow for multiple locations from which to operate the multi-lumen extension system 100. In this embodiment, a clinician may operate the patency device 125 from a first location off-site from an IV device coupled to the multi-lumen extension system 100 while, concurrently or sequentially, operating a LLAD 130 and the fluidic first lumen 105 at a second location off-site from the IV device. Each of the first lumen 105 and second lumen 110 may be secured to the patient's body via, for example, a medical tape or other securement dressings.

The multi-lumen extension system 100 may include, in some embodiments, a grip 115 formed at the second lumen 110. The grip 115 may be any device that is operatively coupled to a patency device 125 formed within the second lumen 110 to allow for a patency check to be conducted by a clinician or other HCP. The grip 115 may be actuated by a clinician or other HCP to cause the patency device 125 to be selectively advanced within the second lumen 110 and cause a portion of the patency device 125 to extend out of a distal end 140 of the multi-lumen extension system 100 and into an IV device that is placed within a patient's blood vessel. The advancement of the patency device 125 by the actuation of the grip 115 causes the patency device 125 to extend out of the second lumen 110 and through any fluidic channels formed in the IV device so as to dislodge any obstructions or check the patency of the IV device. During operation of the multi-lumen extension system 100, the clinician may selectively drag the grip 115 towards the distal end 140 of the multi-lumen extension system 100 to extend the patency device 125 out of the multi-lumen extension system 100. The clinician may also drag the grip 115 towards the proximal end 135 of the first lumen 105 and multi-lumen extension system 100 to retract the patency device 125 back into the second lumen 110 to allow for subsequent patency checks or fluid transfers through the multi-lumen extension system 100 via the first lumen 105.

The grip 115 may be operatively coupled to a hub (not shown) of the patency device 125 as described herein. In an embodiment, the grip 115 may be magnetically coupled to the hub of the patency device 125 by the use of ferromagnetic materials used to for the hub and grip 115. In an embodiment, the grip 115 may be physically advanced through the use of a number of ball bearings that interface with a surface of the hub. In this embodiment, as described herein, a plurality of ball bearings may be placed between the grip 115 and an outer surface of the second lumen 110 to as to interface with the surface of the hub and drag the hub and patency device 125 coaxially through the second lumen 110.

In an embodiment, the second lumen 110 may be made of a clear plastic tubing that allows a clinician to view the progress of the patency device 125 through the second lumen 110. The patency device 125 may, in an embodiment, be made of an elastically pliant material such as a metal that can be bent as it passes through the second lumen 110 and into the fluidic and mechanical channels formed within an IV device.

In an embodiment, the multi-lumen extension system 100 may include a seal 120 placed at a distal end of the second lumen 110. The seal 120 may be used to fluidically seal the second lumen 110 from the fluids passing through the first lumen 105 and through a distal end 140 of the multi-lumen extension system 100. In an embodiment, the distal end 150 of the first lumen 105 may be fluidically coupled to an interior volume of a male adapter used to interface with a female adapter of an IV device. Because, in an embodiment, the second lumen 110 is to serve as a non-fluidic channel for the patency device 125 to be housed within, the seal 120 may prevent any fluids housed within the internal volume of the male adapter from entering into the second lumen 110. In a separate embodiment, the multi-lumen extension system 100 does not include a seal 120, and the second lumen 110 may also be used as a fluidic channel to, for example, pass a blood sample through or pass infusing fluids, such as normal saline solution, various medicaments, and a total parenteral nutrition.

In an embodiment, the second lumen 110 may include a coupling device 1600 that selectively secures the second lumen 110 with its patency device 125 to the remaining portions of the multi-lumen extension system 100. This coupling device 1600 may allow a clinician to selectively use the patency device 125, decouple the patency device 125 from the multi-lumen extension system 100, and replace the second lumen 110 with a fluid stopping device or other type of non-fluidic or fluidic lumen. This increases the versatility of the multi-lumen extension system 100 by allowing a clinician to interface with an IV device coupled to the multi-lumen extension system 100 in a myriad of ways.

In an embodiment, the first lumen 105 may be interfaced with a clamping device 185 that selectively prevents fluids from passing through the first lumen 105. In this embodiment, the clamping device 185 may be used to maintain a pressure within the multi-lumen extension system 100 so that blood does not flow into the first lumen 105 or the hollow within the male adapter formed at the distal end 140 of the multi-lumen extension system 100.

FIG. 17 shows the second state of the multi-lumen extension system 100 with the patency device 125 being extended out of the distal end 140 of the multi-lumen extension system 100. During operation of the multi-lumen extension system 100, the patency device 125 does not contact ambient air and instead is fed through the fluidic and mechanical channels formed within in an IV device coupled to the male coupling device of the multi-lumen extension system 100. Because the patency device 125 is to be used to enter into a blood vessel of a patient or through fluidic channels fluidically coupled to the patient's blood vessel the patency device 125 is maintained within the second lumen 110 until use at an IV device so as to prevent contamination of the patency device 125.

Figure 18:
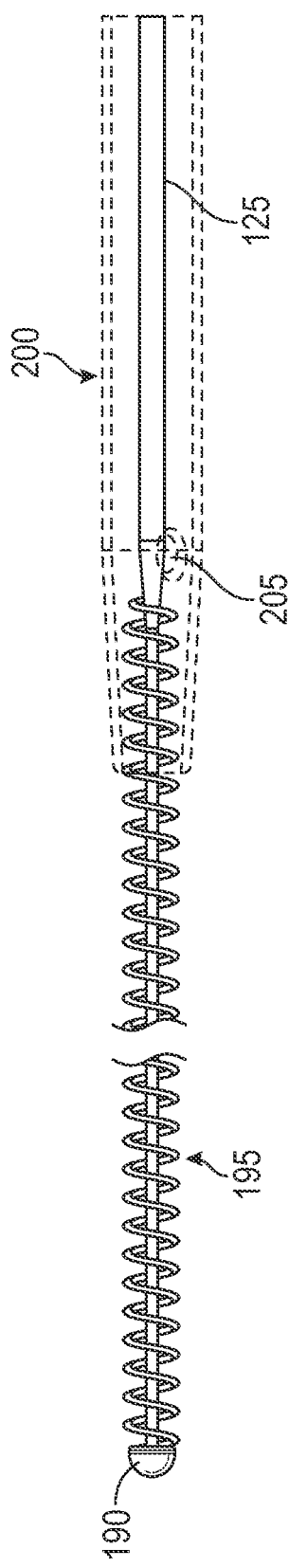
FIG. 18 is a side elevation view of a patency device extending out of a distal end of an IV catheter according to an embodiment of the present disclosure.
Figure 19:
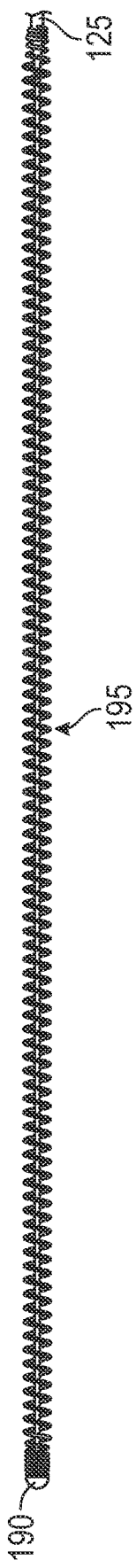
FIG. 19 is a side elevation view of a patency device according to an embodiment of the present disclosure.
Figure 20:
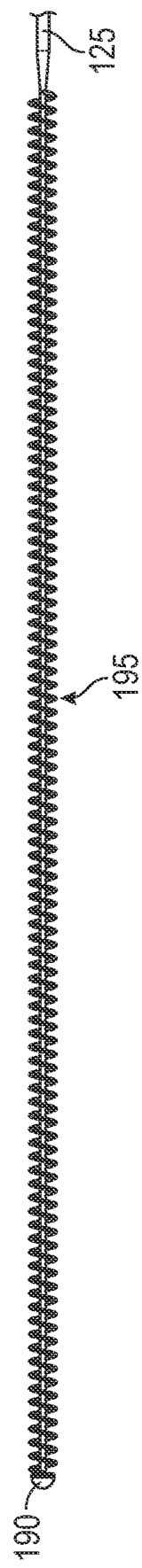
FIG. 20 is a side elevation view of a patency device according to an embodiment of the present disclosure.
Figure 21:
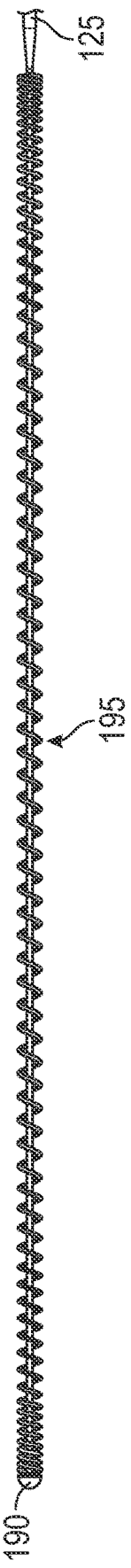
FIG. 21 is a side elevation view of a patency device according to an embodiment of the present disclosure.
Figure 22:
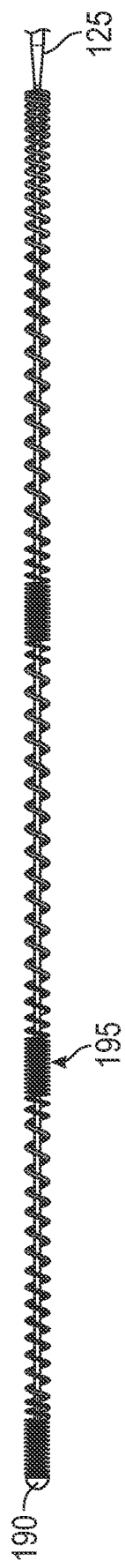
FIG. 22 is a side elevation view of a patency device according to an embodiment of the present disclosure.
Figure 23:
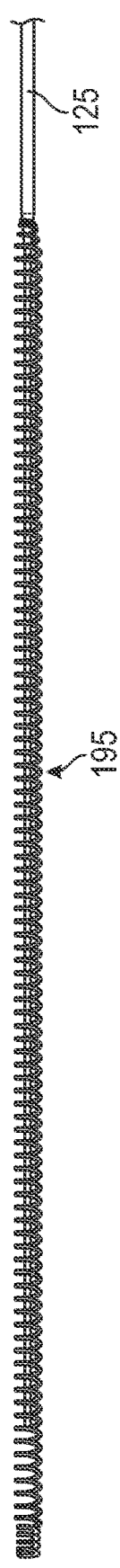
FIG. 23 is a side elevation view of a patency device according to an embodiment of the present disclosure.
Figure 24:
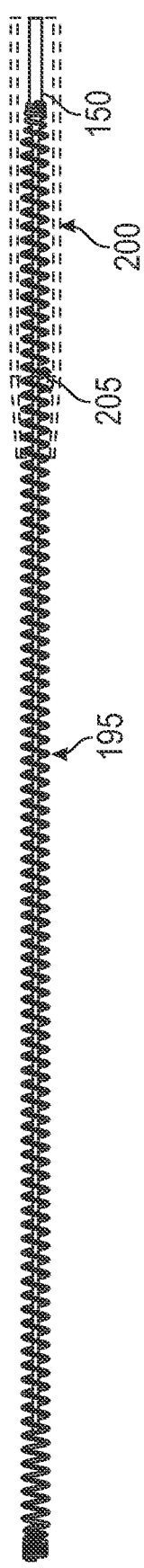
FIG. 24 is a side elevation view of a patency device extending out of a catheter according to an embodiment of the present disclosure.
Figure 25:
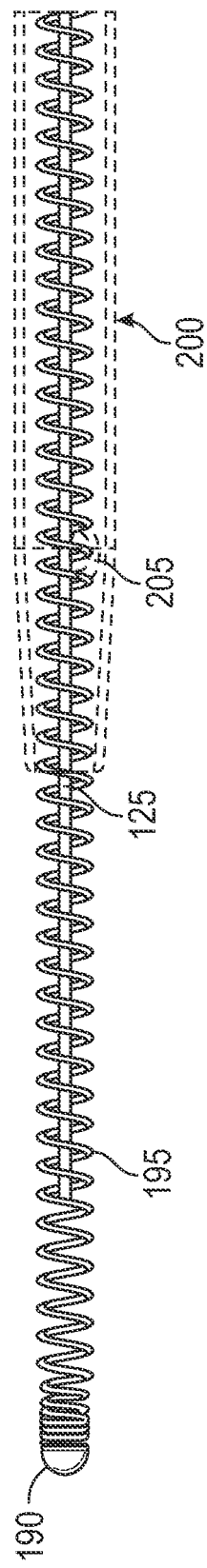
FIG. 25 is a side elevation view of a patency device extending out of a catheter according to an embodiment of the present disclosure.

FIG. 18 is a side elevation view of a patency device 125 extending out of a distal end of an IV catheter 200 according to an embodiment of the present disclosure. In this embodiment, the patency device 125 may include an endcap 190 and a spring winding 195. In this example, the spring winding 195 may be formed coaxially around a guidewire. Although the embodiments presented herein illustrate certain types of guidewires and spring windings 195, the present specification contemplates that any instrument that creates a fluid path into the catheter and that improves patency may be used and the present specification contemplates the use of these various other instruments without going beyond the scope of the principles described herein.

The endcap 190 and spring winding 195 may be formed on a portion of the patency device 125 and may be used to dislodge objects from within the IV catheter 200 during a patency check operation. In an embodiment, the endcap 190 may break apart any blockages while the spring winding 195 allows for flow of any fluids within the IV catheter 200 and the patient's blood vessel when the patency device 125 is deployed. As described herein, a plurality of different types of spring windings 195 may be used.

In an embodiment, the IV catheter 200 may include a number of diffusion ports 205 formed therein. In this embodiment, the diffusion ports 205 may allow for fluids to pass through the IV catheter 200 while the patency device 125 is being deployed. Although the spring winding 195 allows for fluid to pass out of the IV catheter 200, the inclusion of the diffusion ports 205 may allow for faster infusion of infusing fluids, such as normal saline solution, various medicaments, and total parenteral nutrition or passage of blood. Additionally, the diffusion ports 205 may create a flow of fluid out and away from a central axis of the IV catheter 200 and patency device 125.

The IV catheter 200 may be any type of catheter device that fluidically couples a patient's blood vessel to the multi-lumen extension system 100. In an embodiment, the IV catheter 200 is a BD Nexiva™ produced by Becton, Dickinson and Company. In an embodiment, the distal end of the IV catheter 200 may be asymmetrical, symmetrical, or any other shape that allows the patency device 125 to pass therethrough.

FIGS. 19 through 25 each illustrate a side elevation view of a patency device 125 according to an embodiment of the present disclosure. The illustrated examples of the patency device 125 each include a spring winding 195 that is coaxially formed around the patency device 125. In the embodiments presented, the patency device 125 may include a fixed spring winding 195 that does not alter in its pitch along the length of the patency device 125, a variable endcap 190 that alters its pitch along the length of the spring winding 195, and a repeating variable spring winding 195 that repeats a pitch of the windings along the length of the spring winding 195, among other configurations. Each of these types of spring windings 195 may allow for the fluid passing through the IV catheter 200 to pass therethrough at various amounts as the patency device 125 is exiting the distal end of the IV catheter 200.

The embodiments of the patency device 125 illustrated in FIGS. 19 through 25 may or may not include an endcap 190. The endcap 190, in some embodiments, may prevent an initial flow of fluid through the IV catheter 200 until the endcap 190 has completely advanced out of the distal end of the IV catheter 200. In embodiments where the patency device 125 does not include an endcap 190, fluid may be allowed to flow through the IV catheter 200 despite the presence of the patency device 125 within the IV catheter 200. The present description contemplates that the patency device 125 may include any type of spring winding 195 or endcap 190 configuration so as to provide the features of the patency device 125 as described herein. The examples presented in FIGS. 19 through 25 are merely presented as examples and is not meant to limit the orientations and features of the spring winding 195, endcap 190, or patency device 125 as described herein.

Figure 26:
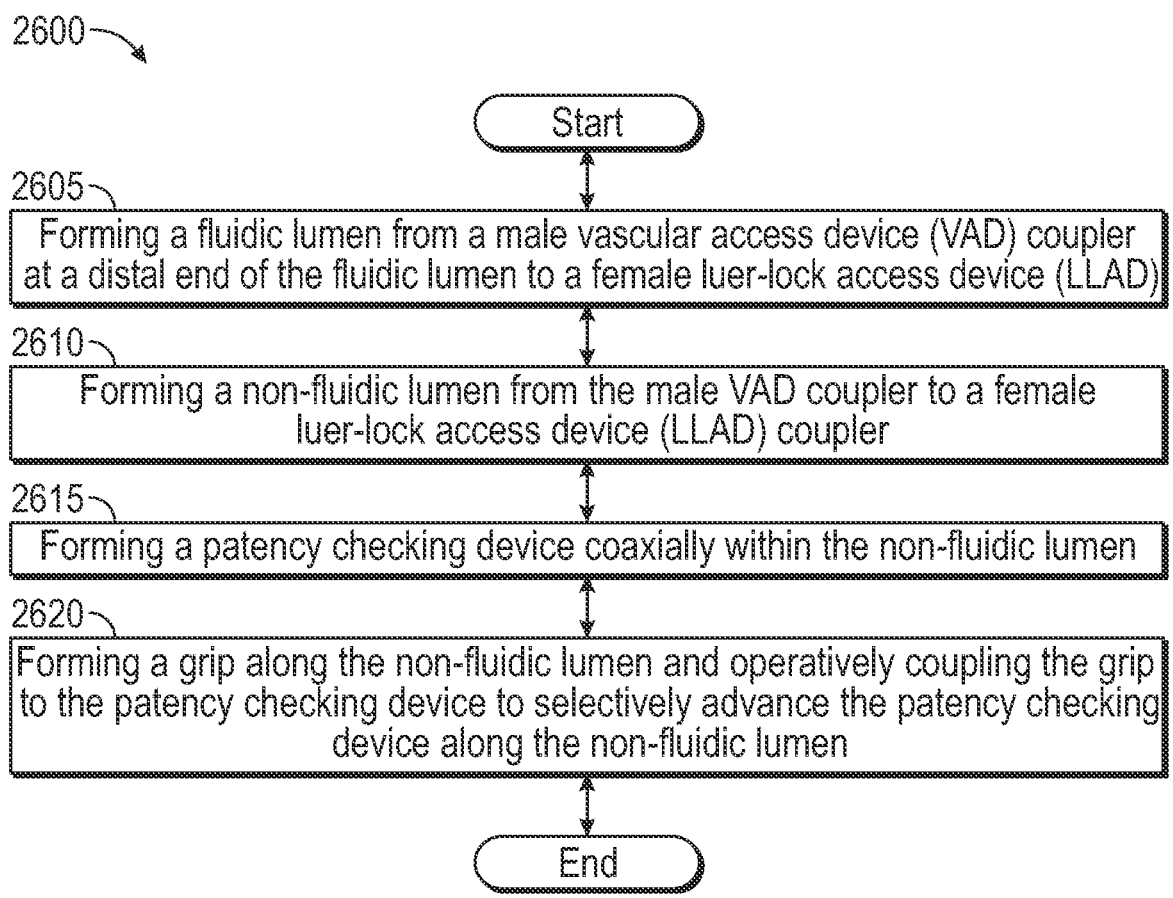
FIG. 26 is a flowchart illustrating a method of manufacturing a multi-lumen extension system according to an embodiment of the present disclosure.

FIG. 26 is a flowchart illustrating a method 2600 of manufacturing a multi-lumen extension system according to an embodiment of the present disclosure. The method 2600 may include, at block 2605, forming a fluidic first lumen from a male vascular access device (VAD) coupler at a distal end of a first lumen to a female luer-lock access device (LLAD). As described herein, the first lumen is a fluidic lumen that allows for the retrieval of a blood sample and/or the administration of infusing fluids, such as normal saline solution, various medicaments, and total parenteral nutrition into a patient's bloodstream via an IV catheter. The present specification describes a male VAD coupler formed at a distal end of the multi-lumen extension system. Alternative coupling devices are also contemplated by the present disclosure and the embodiments presented herein are meant to be non-limiting examples. Additionally, the present disclosure describes a LLAD being coupled to a proximal end of the first lumen. Again, alternative devices may be coupled to the proximal end of the first lumen and these embodiments presented herein are meant to be non-limiting examples. For example, the alternative devices may include fluid delivery devices and sensor devices.

The method 2600 may further include forming a non-fluidic lumen from the male VAD coupler to a female luer-lock access device (LLAD) coupler at block 2610. In an embodiment, the non-fluidic lumen may be physically coupled to the LLAD so that the fluidic lumen and non-fluidic lumen run parallel to each other. In an embodiment, the non-fluidic lumen is not physically coupled to the LLAD allowing for the non-fluidic lumen to be non-parallel with the fluidic lumen.

The method 2600 may further include, at block 2615, forming a patency checking device coaxially within the non-fluidic lumen. The patency checking device may be any type of device that may be passed through the second lumen and through a fluidic and mechanical channel formed within an IV device. In an embodiment, the patency checking device may be made of a guidewire that is formed coaxially within a spring winding and capped with an endcap.

The method 2600 may include, at block 2615, forming a grip along the non-fluidic lumen and operatively coupling the grip to the patency checking device to selectively advance the patency checking device along the non-fluidic lumen. The grip may include any number of devices to operatively couple the grip to a hub formed at a proximal end of the patency device. This may include magnetic devices, ball bearings, or physically coupled arms used to move the patency device within the second lumen.

Again, it is understood that the embodiments of the present application may be combined. As an example, the embodiments of FIGS. 1-29 may be arranged to fit specific uses based on the type of action being conducted.

The presently described blood multi-lumen extension system may allow for the collection of a blood sample, the delivery of infusing fluids, such as normal saline solution, various medicaments, and total parenteral nutrition into a patient's bloodstream, and the patency checking of an IV catheter fluidically and mechanically coupled to the multi-lumen extension system. The multi-lumen extension system described herein improves patency of an indwell VAD, optimizes blood flow rate during collection, optimizes a sample quality of blood collected, improves workflow, and reduces the risk of manipulation related to IV catheter complications.

The multi-lumen extension system described herein may provide for a flexible extension tubing with a dedicated fluid path lumen that is optimized for blood collection, and a second lumen that contains an atraumatic guidewire instrument that improves the patency of an indwell catheter. The multi-lumen extension system may be scaled in length in the embodiments where no rigid lumen is used. Additionally, the dedicated fluid path may be optimized for use with a given length catheter that requires a longer instrument to go beyond the tip of the catheter, and therefore a longer extension set. Having a flexible design also reduces the likelihood of IV catheter dislodgement and complications related to manipulation of the site.

The multi-lumen extension system is also relatively more compact and has many of the benefits of an extension set when used with an IV catheter. The multi-lumen extension system, in some embodiments, may eliminate a rigid housing and may remain flexible to reduce the likelihood of catheter complications when used. In some embodiments, the multi-lumen extension system may include an integrated LLAD for improved workflow and reduced steps during a blood draw. The multi-lumen extension system also reduces medical waste (fewer components and less volume) and can more easily fit within a sharps container or medical waste receptacle.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the disclosed embodiments.

The invention claimed is:

1. A multi-lumen extension system, comprising:
 a multi-lumen tube including a distal end and a proximal end, the multi-lumen tube comprising:
  a first lumen forming a fluidic channel within the multi-lumen extension system; and
  a second lumen forming a non-fluidic channel within the multi-lumen extension system, the second lumen in parallel with the first lumen and laterally offset therefrom within the multi-lumen tube;
 a patency instrument housed within the second lumen, the patency instrument comprising a guidewire and a hub, with the hub positioned within the second lumen and the guidewire comprising a proximal end joined to the hub, with the guidewire extending distally from the hub;
 a seal between the first lumen and the second lumen to prevent fluid from entering the second lumen from the first lumen;
 a coupling mechanism positioned at the distal end of the multi-lumen tube, the coupling mechanism comprising a male adapter configured to interface with a female adapter on an intravenous (IV) device;
 a luer-lock access device (LLAD) connected to the proximal end of the multi-lumen tube; and
 a grip formed along the multi-lumen tube and wrapped at least partially thereabout, the grip operatively coupled to the patency instrument housed within the second lumen to selectively translate the patency instrument along the second lumen, wherein the grip is separately and independently movable along an outer surface of the multi-lumen tube;
 wherein the grip comprises a compressible grip that, when compressed by a user, interfaces with the patency instrument through the multi-lumen tube, such that a proximal or distal movement of the grip along the multi-lumen tube causes a corresponding movement of the patency instrument; and
 wherein a distal end of the first lumen is fluidically coupled to the male adapter and a proximal end of the first lumen is fluidically coupled to the LLAD, with the first lumen extending through the multi-lumen tube from the male adapter to the LLAD to fluidly connect the male adapter and the LLAD.

2. The multi-lumen extension system of claim 1, wherein the grip comprises:
 a ring formed coaxially around the second lumen; and
 a plurality of ball bearings positioned between the ring and an outside wall of the second lumen;
 wherein the patency instrument comprises a surface that engages the plurality of ball bearings to cause the patency instrument to move within the second lumen upon movement of the ring.

3. The multi-lumen extension system of claim 2, wherein the second lumen comprises a gas vent that allows gases to escape from the second lumen upon movement of the patency instrument.

4. The multi-lumen extension system of claim 1, further comprising a luer-lock access device (LLAD) operatively coupled to a proximal end of the first lumen.

5. The multi-lumen extension system of claim 1, wherein a distal end of the second lumen is oriented non-parallel to a major axis of the first lumen.

6. The multi-lumen extension system of claim 1, wherein the guidewire is formed coaxially within the second lumen.

7. The multi-lumen extension system of claim 1, wherein the grip is movable along an outer surface of the multi-lumen tube at least partially between the distal end and the proximal end thereof to selectively translate the patency instrument along the second lumen.

8. The multi-lumen extension system of claim 7, wherein in moving the grip along the outer surface of the multi-lumen tube between the distal end and the proximal end thereof, an entirety of the grip is moved along the multi-lumen tube.

9. The multi-lumen extension system of claim 1, wherein the multi-lumen tube comprises a single, integrally formed tube, and wherein the first lumen and the second lumen are voids formed within the single, integrally formed tube.

10. The multi-lumen extension system of claim 1, wherein with the second lumen in parallel with and laterally offset from the first lumen, the second lumen is positioned outside of the first lumen and isolated from the first lumen.

11. A multi-lumen extension system, comprising:
  a multi-lumen tube including a distal end and a proximal end, the multi-lumen tube comprising:
    a first lumen forming a fluidic channel within the multi-lumen extension system; and
    a second lumen forming a non-fluidic channel within the multi-lumen extension system, the second lumen in parallel with the first lumen and laterally offset therefrom within the multi-lumen tube;
  a patency instrument housed within the second lumen, the patency instrument comprising a guidewire and a hub, with the hub positioned within the second lumen and the guidewire comprising a proximal end joined to the hub, with the guidewire extending distally from the hub;
  a seal between the first lumen and the second lumen to prevent fluid from entering the second lumen from the first lumen;
  a coupling mechanism positioned at the distal end of the multi-lumen tube, the coupling mechanism comprising a male adapter configured to interface with a female adapter on an intravenous (IV) device;
  a luer-lock access device (LLAD) connected to the proximal end of the multi-lumen tube; and
  a grip positioned on the multi-lumen tube and wrapped at least partially thereabout, with the grip separately and independently movable along an outer surface of the multi-lumen tube, wherein the grip is operatively coupled to the patency instrument housed within the second lumen, and wherein the grip is movable relative to and along the outer surface of the multi-lumen tube at least partially between the distal end and the proximal end thereof to selectively translate the patency instrument along the second lumen;
  wherein a distal end of the first lumen is fluidically coupled to the male adapter and a proximal end of the first lumen is fluidically coupled to the LLAD, with the first lumen extending through the multi-lumen tube from the male adapter to the LLAD to fluidly connect the male adapter and the LLAD.

12. The multi-lumen extension system of claim 11, wherein in moving the grip along the outer surface of the multi-lumen tube between the distal end and the proximal end thereof, an entirety of the grip is moved along the multi-lumen tube.

* * * * *